(12) United States Patent
Kiesewetter et al.

(10) Patent No.: US 11,220,325 B2
(45) Date of Patent: Jan. 11, 2022

(54) THRUST PRODUCING UNIT WITH AT LEAST TWO ROTOR ASSEMBLIES AND A SHROUDING

(71) Applicant: AIRBUS HELICOPTERS DEUTSCHLAND GMBH, Donauworth (DE)

(72) Inventors: Uwe Kiesewetter, Rain am Lech (DE); Sebastian Mores, Munich (DE); Marius Bebesel, Augsburg (DE); Rupert Pfaller, Riemerling (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 63 days.

(21) Appl. No.: 15/906,013

(22) Filed: Feb. 27, 2018

(65) Prior Publication Data
US 2018/0244367 A1    Aug. 30, 2018

(30) Foreign Application Priority Data

Feb. 27, 2017   (EP) ..................................... 17400008

(51) Int. Cl.
*B64C 11/00*    (2006.01)
*B64C 11/48*    (2006.01)
(Continued)

(52) U.S. Cl.
CPC .............. *B64C 11/001* (2013.01); *B64C 9/14* (2013.01); *B64C 11/48* (2013.01); *B64C 27/08* (2013.01);
(Continued)

(58) Field of Classification Search
CPC ....... B64C 11/001; B64C 11/46; B64C 11/48; B64C 27/08; B64C 27/20; B64C 27/52;
(Continued)

(56) References Cited

U.S. PATENT DOCUMENTS

| 3,584,810 A | 6/1971 | Velton |
| 5,150,857 A | 9/1992 | Moffitt et al. |

(Continued)

FOREIGN PATENT DOCUMENTS

| CN | 101157385 A | 4/2008 |
| CN | 201306711 Y | 9/2009 |

(Continued)

OTHER PUBLICATIONS

European Search Report for European Application No. EP 17400003, Completed by the European Patent Office, dated Jun. 22, 2017, 9 pages.

(Continued)

*Primary Examiner* — Woody A Lee, Jr.
*Assistant Examiner* — Justin A Pruitt
(74) *Attorney, Agent, or Firm* — Brooks Kushman P.C.

(57) ABSTRACT

A thrust producing unit for producing thrust in a predetermined direction, comprising at least two rotor assemblies and a shrouding that accommodates at most one of the at least two rotor assemblies, wherein the shrouding defines a cylindrical air duct that is axially delimited by an air inlet region and an air outlet region, and wherein the air inlet region exhibits in circumferential direction of the cylindrical air duct an undulated geometry.

20 Claims, 9 Drawing Sheets

(51) Int. Cl.
  *B64C 27/20* (2006.01)
  *B64C 9/14* (2006.01)
  *B64C 27/08* (2006.01)
  *B64C 39/02* (2006.01)

(52) U.S. Cl.
  CPC ............ *B64C 27/20* (2013.01); *B64C 39/024* (2013.01); *B64C 2201/027* (2013.01); *B64C 2201/108* (2013.01); *B64C 2201/162* (2013.01); *B64C 2201/165* (2013.01); *B64D 2241/00* (2013.01)

(58) Field of Classification Search
  CPC . B64C 29/02; B64C 29/0016; B64C 29/0025; B64C 29/0033; B64C 2201/027; B64C 2201/108; B64C 2201/162; B64C 2201/165; B64C 39/024; B64C 9/14; B64D 25/00; B64D 2241/00
  USPC .......................................................... 416/123
  See application file for complete search history.

(56) References Cited

U.S. PATENT DOCUMENTS

| | | | |
|---|---|---|---|
| 5,152,478 | A | 10/1992 | Cycon et al. |
| 5,277,381 | A | 1/1994 | Piasecki |
| 5,575,438 | A | 11/1996 | McGonigle et al. |
| 6,568,630 | B2 | 5/2003 | Yoeli |
| 7,857,253 | B2* | 12/2010 | Yoeli ........................ B64C 1/22 244/12.3 |
| 7,946,528 | B2 | 5/2011 | Yoeli |
| 8,240,597 | B2 | 8/2012 | Entsminger et al. |
| D678,169 | S | 3/2013 | Kennelly et al. |
| 8,387,911 | B2 | 3/2013 | Collette |
| 8,393,564 | B2 | 3/2013 | Kroo |
| 8,733,690 | B2 | 5/2014 | Bevirt et al. |
| 8,991,741 | B2 | 3/2015 | Wang |
| 9,950,789 | B2 | 4/2018 | Tsunekawa et al. |
| 2005/0082421 | A1 | 4/2005 | Perlo et al. |
| 2006/0226281 | A1 | 10/2006 | Walton |
| 2007/0034738 | A1 | 2/2007 | Sanders, Jr. et al. |
| 2007/0057113 | A1 | 3/2007 | Parks |
| 2007/0158494 | A1 | 7/2007 | Burrage |
| 2010/0264256 | A1* | 10/2010 | Yim ........................ B64C 27/20 244/17.23 |
| 2011/0001001 | A1* | 1/2011 | Bryant ................ B64C 29/0033 244/12.5 |
| 2012/0153087 | A1 | 6/2012 | Collette et al. |
| 2013/0068877 | A1 | 3/2013 | Choi et al. |
| 2013/0118856 | A1 | 5/2013 | Long |
| 2013/0206919 | A1* | 8/2013 | Shachor .................. B64C 29/04 244/23 A |
| 2014/0091172 | A1 | 4/2014 | Arlton et al. |
| 2014/0151494 | A1 | 6/2014 | Cvrlje |
| 2015/0053826 | A1 | 2/2015 | Tsunekawa et al. |
| 2015/0127209 | A1 | 5/2015 | Al-Garni et al. |
| 2016/0009387 | A1* | 1/2016 | Kummer ............. B64C 29/0025 244/6 |
| 2016/0023754 | A1 | 1/2016 | Wiegand |
| 2016/0207625 | A1 | 7/2016 | Judas et al. |
| 2016/0311530 | A1 | 10/2016 | Smith |
| 2018/0037317 | A1 | 2/2018 | Ichihara et al. |
| 2018/0229839 | A1* | 8/2018 | Kimchi ................. B64C 39/024 |

FOREIGN PATENT DOCUMENTS

| | | | |
|---|---|---|---|
| CN | 102120489 | A | 7/2011 |
| CN | 102285449 | A | 12/2011 |
| CN | 103010463 | A | 4/2013 |
| CN | 104787315 | A | 7/2015 |
| CN | 104787316 | A | 7/2015 |
| CN | 204956910 | U | 1/2016 |
| DE | 102005022706 | A1 | 11/2006 |
| DE | 102013108207 | A1 | 2/2015 |
| EP | 1502852 | A1 | 2/2005 |
| EP | 2147858 | A2 | 1/2010 |
| EP | 2151379 | A2 | 2/2010 |
| EP | 2234883 | A2 | 10/2010 |
| EP | 2551190 | A1 | 1/2013 |
| EP | 2551193 | A1 | 1/2013 |
| EP | 2551198 | A1 | 1/2013 |
| EP | 3098161 | A1 | 11/2016 |
| GB | 905911 | | 9/1962 |
| GB | 1474831 | | 5/1977 |
| GB | 2360752 | A | 10/2001 |
| GB | 2389826 | A | 12/2003 |
| JP | H04231290 | A | 8/1992 |
| JP | H07125696 | A | 5/1995 |
| JP | H09512765 | A | 12/1997 |
| JP | 2005047500 | A | 2/2005 |
| JP | 2010030585 | A | 2/2010 |
| JP | 2010036889 | A | 2/2010 |
| JP | 2010036890 | A | 2/2010 |
| JP | 2013032147 | A | 2/2013 |
| KR | 20110055842 | A | 5/2011 |
| KR | 101451646 | B1 | 10/2014 |
| WO | 0064736 | A1 | 11/2000 |
| WO | 2004065208 | A2 | 8/2004 |
| WO | 2009077968 | A2 | 6/2009 |
| WO | 2014119155 | A1 | 8/2014 |
| WO | 2015028627 | A1 | 3/2015 |
| WO | 2016136848 | A1 | 9/2016 |

OTHER PUBLICATIONS

European Search Report for European Application No. EP 17400002, Completed by the European Patent Office, dated Jul. 11, 2017, 7 pages.
European Search Report for European Application No. EP 17400008, Completed by the European Patent Office, dated Aug. 18, 2017, 7 pages.
Notice of Preliminary Rejection for Korean Application No. 10-2018-0022866, dated May 17, 2019, 3 Pages.
Office Action for Japanese Application No. 2018-009621, dated Oct. 31, 2018, 3 pages.
Indian Examination Report dated Oct. 31, 2019, Application No. 201844003377, Applicant Airbus Helicopters Deutschland GmbH, 6 Pages.
Chinese Office Action and Search Report dated Nov. 12, 2020 (with English Machine Translation), Application No. 201810150685.6, Applicant Airbus Helicopters Deutschland GmbH, 17 Pages.

* cited by examiner

Fig. 7
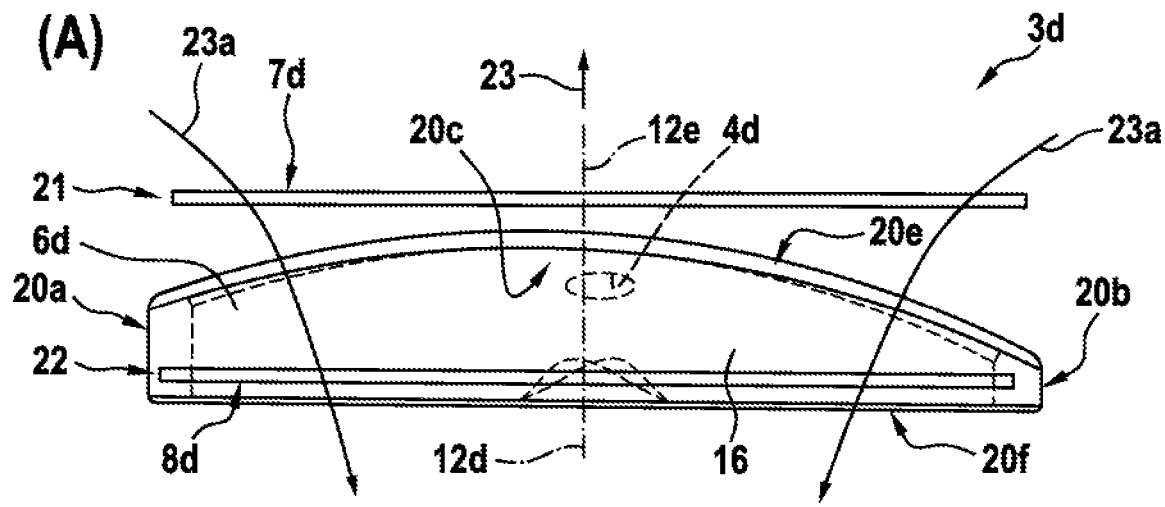
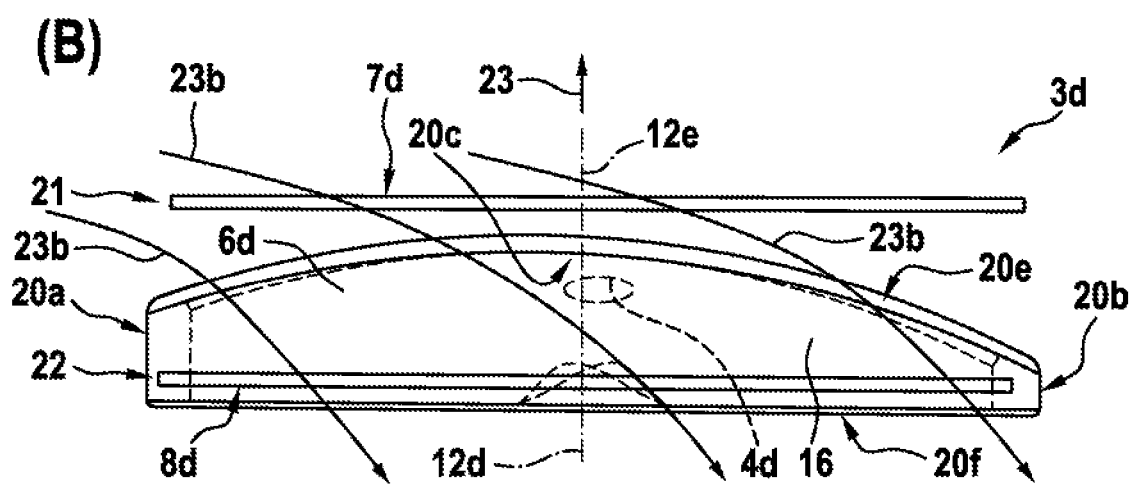
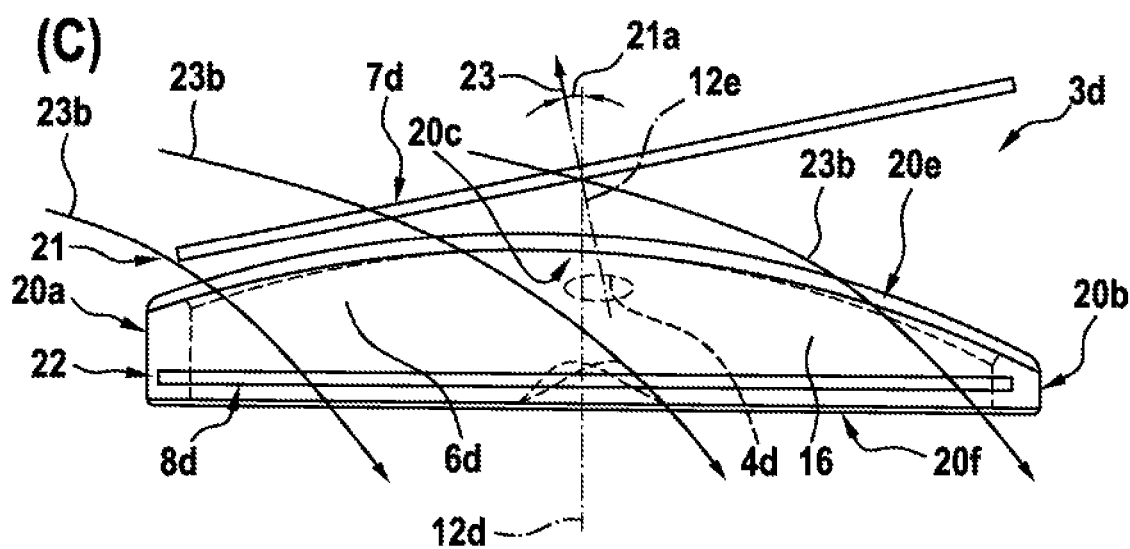

THRUST PRODUCING UNIT WITH AT LEAST TWO ROTOR ASSEMBLIES AND A SHROUDING

CROSS-REFERENCE TO RELATED APPLICATIONS

This application claims priority to European patent application No. EP 17400008.3 filed on Feb. 27, 2017, the disclosure of which is incorporated in its entirety by reference herein.

BACKGROUND OF THE INVENTION

1) Field of the Invention

The invention is related to a thrust producing unit for producing thrust in a predetermined direction, the thrust producing unit comprising at least two rotor assemblies and a shrouding. The invention is further related to a multirotor aircraft with at least one thrust producing unit for producing thrust in a predetermined direction, the thrust producing unit comprising at least two rotor assemblies and a shrouding.

2) Description of Related Art

Various conventional multirotor aircrafts are known, e.g. from the documents EP 2 551 190 A1, EP 2 551 193 A1, EP 2 551 198 A1, EP 2 234 883 A1, WO 2015/028627 A1, US D678 169 S, U.S. Pat. No. 6,568,630 B2, U.S. Pat. No. 8,393,564 B2, U.S. Pat. No. 7,857,253 B2, U.S. Pat. No. 7,946,528 B2, U.S. Pat. No. 8,733,690 B2, US 2007/0034738 A1, US 2013/0118856 A1, DE 10 2013 108 207 A1, GB 905 911 and CN 2013 06711 U. Other multirotor aircrafts are also known from the state of the art, such as e.g. the Boeing CH-47 tandem rotor helicopter, the Bell XV-3 tilt rotor aircraft, the Bell XV-22 quad tilt with ducted rotors, as well as so-called drones and, more particularly, so-called quad drones, such as e.g. described in the documents US 2015/0127209 A1, DE 10 2005 022 706 A1 and KR 101 451 646 B1. Furthermore, multirotor aircraft studies and fictions also exist, such as e.g. the skyflyer SF MK II from Skyflyer Technology GmbH and the multicopter shown in the Avatar movie.

Each one of these conventional multirotor aircrafts is equipped with two or more thrust producing units that are provided for producing thrust in a predetermined direction during operation of the multirotor aircraft. In general, each thrust producing unit includes one or more rotors or propellers and is, usually, designed for specific flight conditions. By way of example, a thrust producing unit that is designed as an airplane propeller operates at its optimum in cruise conditions, whereas a thrust producing unit that is designed as propeller of a compound helicopter is rather optimized for hover or forward flight conditions, while a thrust producing unit that implements e.g. a so-called Fenestron® tail rotor is particularly designed for hover conditions.

In all of these examples, the respective thrust producing unit is optimized for operation in axial air flow conditions, i.e. in an air flow direction that is oriented at least approximately along a rotor axis resp. rotation axis of the given one or more rotors or propellers and, therefore, referred to as an axial air flow direction. If, however, the respective thrust producing unit is operated in transversal air flow conditions, i.e. in an air flow direction that is oriented transverse to the rotor axis of the given one or more rotors or propellers and, therefore, referred to as a non-axial air flow direction, a respective efficiency of the thrust producing unit usually decreases considerably.

By way of example, in the case of operation of a multirotor aircraft with two or more thrust producing units, the thrust producing units will be subjected to axial air flow conditions e.g. during a vertical take-off phase. Subsequently, respective thrust vectors generated by the thrust producing units can be inclined in a predetermined direction, e.g. by rotating the thrust producing units accordingly, so that the multirotor aircraft gains velocity and leaves a previous hovering condition such that is converts to forward flight, wherein the thrust producing units are subjected to transversal air flow conditions. However, in the transversal air flow conditions, respective ducts or shrouds, which are beneficial in axial air flow conditions, are penalizing by generating a comparatively large amount of drag. In other words, an underlying advantage provided by the ducts or shrouds in hovering turns out to be a disadvantage in forward flight, which increases with increasing a respective advancing speed of the multirotor aircraft in forward flight.

Furthermore, it should be noted that in axial air flow conditions a ducted rotor or propeller, i.e. a rotor or propeller that is provided with a duct or shroud, is approximately 25% to 50% more efficient than an equivalent isolated or non-ducted rotor or propeller, i.e. a rotor or propeller without duct or shroud, which has comparable global dimensions, i.e. diameter and mean chord. In other words, the presence of a duct or shroud increases a respectively produced thrust of a given thrust producing unit at constant required power. Therefore, conventional thrust producing units are frequently provided with one or more rotors or propellers that is/are completely enclosed in an associated duct or shroud. This classical configuration uses a respective rotor or propeller induced velocity to generate thrust also from the duct or shroud.

In general, a duct or shroud is defined by an enclosed, annular surface that is arranged around a rotor or propeller in order to improve respective aerodynamics and performances of the rotor or propeller. A conventional duct or shroud is usually not rotatable, i.e. cannot be inclined, and has a height that is selected such that a given rotor or propeller is fully enclosed therein.

However, as the duct or shroud must have a certain height or length in order to enclose an associated rotor or propeller and is, thus, comparatively large in size, the duct or shroud increases an overall weight of a respective multirotor aircraft due to its size, and further increases drag e.g. during forward flight, i.e. in transversal air flow conditions, as the duct or shroud cannot be inclined for adjustment of an underlying thrust vector direction. The comparatively large size also leads to a comparatively large projection surface on which wind and/or wind gust may act. This leads to an increased overpower necessity for the respective multirotor aircraft. Furthermore, if two or more rotors or propellers are e.g. coaxially positioned atop of each other, a given duct or shroud that is provided for enclosing these rotors or propellers will even require a still larger height and be still heavier. Moreover, conventional ducts or shrouds are usually not actively rotated and must be designed comparatively stiff, as usually a minimum gap between rotors or propellers and duct or shroud surface is requested. In addition, conventional ducts or shrouds of respective thrust producing units are not suitable for enclosing differently configured rotors or propellers, i.e. rotors or propellers having differing inclinations, positioning and/or sizes resp. diameters.

In summary, in a conventional thrust producing unit with a duct or shroud, a thrust vector that is produced in operation in axial air flow conditions is aligned with a rotor axis of a respective rotor or propeller of the thrust producing unit and directed against a direction of a velocity field induced by the rotor or propeller in operation. The rotor or propeller accelerates a certain mass-flow through an associated rotor or propeller plane or disk. A resulting flow acceleration, which occurs when air traverses the rotor or propeller plane or disk, forms areas of under-pressure around a respective collector region of the duct or shroud, thus, generating additional thrust. This generation of additional thrust is an important advantage resulting from the use of the duct or shroud that is, however, strongly penalizing in forward flight, i.e. in transversal air flow conditions, due to additional drag generated by the duct or shroud. The additional drag is directly proportional to a respective frontal area that is defined by a product of height and width of the duct or shroud. Thus, by way of example, for a thrust producing unit having a counter-rotating rotor or propeller configuration with two rotors or propellers that are completely embedded into a single duct or shroud, the additional drag almost doubles compared with a thrust producing unit that is only provided with one rotor or propeller that is completely embedded into a single duct or shroud.

The document U.S. Pat. No. 5,150,857 A describes an unmanned aerial vehicle (UAV) having a toroidal fuselage that surrounds a pair of coaxial, multi-bladed, counterrotating rotors. The toroidal fuselage defines a duct or shroud and has an airfoil profile that is configured to provide high hover efficiency and to produce a pressure distribution that provide high lift forces. The airfoil profile is symmetrical and adapted to counteract the undesirable nose-up pitching moments experienced by ducted rotary-type UAVs in forward translational flight. However, the symmetrical duct or shroud that is defined by the toroidal fuselage exhibits the above-described disadvantages in forward flight, i.e. in transversal air flow conditions.

BRIEF SUMMARY OF THE INVENTION

It is, therefore, an object of the present invention to provide a new thrust producing unit, in particular for use with multirotor aircrafts, which exhibits improved aerodynamics and performances in transversal air flow conditions. This object is solved by a thrust producing unit for producing thrust in a predetermined direction, the thrust producing unit comprising the features of claim 1. More specifically, according to the present invention a thrust producing unit for producing thrust in a predetermined direction comprises at least two rotor assemblies and a shrouding that accommodates at most one of the at least two rotor assemblies. The shrouding defines a cylindrical air duct that is axially delimited by an air inlet region and an air outlet region, wherein the air inlet region exhibits in circumferential direction of the cylindrical air duct an undulated geometry.

It should be noted that the term "shrouding" should be understood as encompassing simultaneously the terms "duct" and "shroud". In other words, in the context of the present invention, the term "shrouding" refers interchangeably to a duct or a shroud.

Advantageously, the inventive thrust producing unit is implemented as a shrouded multiple rotor assembly configuration that leads to a significantly reduced drag in transversal air flow conditions, e.g. in forward flight of a given multirotor aircraft that uses the inventive thrust producing unit. This significantly reduced drag results not only from the accommodation of the at most one of the at least two rotor assemblies in the shrouding, so that an overall height of the shrouding can be reduced significantly, but also from the inventive design of the shrouding itself, in particular the undulated geometry of the air inlet region in circumferential direction of the cylindrical air duct.

More specifically, the inventive shrouding and all associated elements are preferably axially non-symmetric, i.e. non-symmetric over the azimuth $\psi$ of the shrouding. In other words, the shrouding is designed on the basis of a variable factor with respect to all associated elements, i.e.:

Height vs. Azimuth $\psi$,
Air inlet region radius vs. Azimuth $\psi$,
Air outlet region radius vs. Azimuth $\psi$, and/or
Arrangement of additional lifting surfaces vs. Azimuth $\psi$.

In particular, the variable height of the shrouding enables significant advantages in the trade-off between vertical take-off and hovering, wherein an underlying efficiency increases with an increase of the height of the shrouding, and forward flight, wherein an underlying drag decreases with a decrease of the height of the shrouding, as this reduces a respective drag area of the shrouding.

Furthermore, the inventive thrust producing unit exhibits a significantly lower weight than a conventional shrouded thrust producing unit having a single shrouding that completely encloses two rotor or propeller assemblies, while having comparable performances in axial air flow conditions, i.e. in hover flight of the respective multirotor aircraft. In fact, it should be noted that a conventional shrouded thrust producing unit having a single shrouding that completely encloses two or more, preferentially counter-rotating rotor or propeller assemblies provides the same thrust versus power characteristics than e.g. a thrust producing unit having a much shorter shrouding that encloses only one of the two or more rotor or propeller assemblies, such as the inventive thrust producing unit, while leaving the other(s) unshrouded, i.e. exposed to the air. This is due to the fact that the above-mentioned additional thrust is generated by the air inlet region defined by the shrouding only, and not by the duct resp. shrouding itself. Moreover, a respective velocity field induced by the at least two rotor or propeller assemblies with the long and short shroudings is such that the under-pressure field generated on the air inlet region is also the same for the long and short shroud configurations. This likewise applies to a configuration featuring multiple rotor or propeller assemblies, each being enclosed in a single associated shrouding having a minimized height.

Preferably, the shrouding of the inventive thrust producing unit is used as an additional lifting device during hover and forward flight cases of a multirotor aircraft that features the inventive thrust producing unit and, thus, beneficially allows reduction of a respective power consumption of the at most one of the at least two rotor assemblies that is accommodated in the shrouding. Furthermore, the shrouding advantageously allows to reduce at least an underlying diameter of the at most one of the at least two rotor assemblies that is accommodated therein, since the shrouding increases its effectiveness. In addition, the shrouding beneficially provides for a shielding effect with respect to the at most one of the at least two rotor assemblies that is accommodated therein and, thus, advantageously allows to reduce a respective rotor noise footprint on ground.

According to one aspect, the inventive thrust producing unit can be provided with a foreign object protection, e.g. by being enclosed by a grid, in order to protect the at most one of the at least two rotor assemblies that is accommodated therein from foreign objects. Such a foreign object protection beneficially prevents misuse and accidents by and of individuals, e.g. by preventing them from getting their hands caught in rotating parts, thereby leading to an increased operational safety level of the inventive thrust producing unit.

Advantageously, by providing the inventive thrust producing unit with the at least two rotor assemblies that define different rotor planes, the rotor assemblies can be positioned above each other and rotated in a counter rotating manner, leading to a thrust producing unit that provides for an increased safety level and that allows reduction of the overall dimensions of an associated multirotor aircraft, resulting in a comparatively small aircraft, since the two or more rotor planes can be combined in a single thrust producing unit. Preferably, the at least two rotor assemblies of the inventive thrust producing unit, each of which defines an associated rotor plane or surface, are positioned on top of each other, either coaxially or with separate individual rotor axes, and can be inclined with respect to each other. Furthermore, the inventive thrust producing unit is adapted for providing torque individually as a result of its counter-rotating rotor assemblies, which can be used to maneuver a given multirotor aircraft that features the inventive thrust producing unit, e.g. with respect to yawing.

According to a preferred embodiment, the cylindrical air duct exhibits a height defined between the air outlet region and the air inlet region in axial direction of the cylindrical air duct that varies in circumferential direction of the cylindrical air duct, wherein the height that varies in the circumferential direction of the cylindrical air duct defines the undulated geometry of the air inlet region.

According to a further preferred embodiment, the cylindrical air duct comprises in circumferential direction a leading edge and a diametrically opposed trailing edge, and a board side lateral shoulder and a diametrically opposed star board side lateral shoulder, wherein the board side lateral shoulder and the star board side lateral shoulder are respectively arranged in the circumferential direction of the cylindrical air duct between the leading edge and the trailing edge, and wherein the height at the leading edge is smaller than the height at the board side lateral shoulder and/or the star board side lateral shoulder.

According to a further preferred embodiment, the height at the trailing edge is smaller than the height at the board side lateral shoulder and/or the star board side lateral shoulder.

According to a further preferred embodiment, the height at the trailing edge is smaller than the height at the leading edge.

According to a further preferred embodiment, the height at the board side lateral shoulder and/or the star board side lateral shoulder is selected in a range from 0.05*D to 0.5*D, wherein D defines a diameter of the cylindrical air duct.

According to a further preferred embodiment, the air inlet region of the cylindrical air duct exhibits an air inlet region radius that varies in the circumferential direction of the cylindrical air duct, wherein the air inlet region radius differs between at least two of the leading edge, the trailing edge, the board side lateral shoulder and the star board side lateral shoulder.

According to a further preferred embodiment, the air outlet region of the cylindrical air duct exhibits an air outlet region radius that varies in the circumferential direction of the cylindrical air duct, wherein the air outlet region radius differs between at least two of the leading edge, the trailing edge, the board side lateral shoulder and the star board side lateral shoulder.

According to a further preferred embodiment, the trailing edge of the cylindrical air duct is at least essentially open and provided with a stiffening element.

According to a further preferred embodiment, the trailing edge of the cylindrical air duct is equipped with a flap.

According to a further preferred embodiment, the leading edge of the cylindrical air duct is provided with an additional lifting surface.

According to a further preferred embodiment, a first rotor assembly of the at least two rotor assemblies is arranged outside of the cylindrical air duct and adjacent to the air inlet region of the cylindrical air duct, wherein the shrouding accommodates a second rotor assembly of the at least two rotor assemblies.

According to a further preferred embodiment, the first rotor assembly defines a first rotor axis and the second rotor assembly defines a second rotor axis, the first and second rotor axes being coaxially arranged.

According to a further preferred embodiment, the first and second rotor axes are inclined by associated inclination angles comprised in a range between −60° and +60°.

The present invention further relates to a multirotor aircraft comprising at least one thrust producing unit that is configured as described above.

Advantageously, the shrouding of the inventive thrust producing unit allows reducing respective overall dimensions of the inventive multirotor aircraft that features the inventive thrust producing unit. Furthermore, individuals approaching the shrouded thrust producing unit are protected against injury, foreign object damages of the thrust producing unit in operation, such as e.g. bird strike or wire strike, can securely and reliably be prevented, and the overall operational safety of the associated multirotor aircraft in case of air collisions can be improved.

Moreover, respective aerodynamics, acoustics and performances can be improved by reducing a respective rotor blade loading in operation, reducing an overall power consumption, reducing a respective noise emission and ameliorating functioning in hover and forward flight of the inventive multirotor aircraft. Furthermore, an underlying required diameter of the thrust producing unit can be reduced. Additionally, lift of the inventive multirotor aircraft is improved by the shrouding itself, potentially reducing the overall power required by the inventive multirotor aircraft.

It should be noted that although the inventive aircraft is described above with reference to a multirotor structure with multiple rotor assemblies, it could likewise be implemented as a multipropeller structure with multiple propeller assemblies or as a multipropeller and -rotor structure. More specifically, while rotors are generally fully articulated, propellers are generally not articulated at all. However, both can be used for generating thrust and, thus, for implementing the thrust producing units according to the present invention. Consequently, any reference to rotors or rotor structures in the present description should likewise be understood as a reference to propellers and propeller structures, so that the inventive multirotor aircraft can likewise be implemented as a multipropeller and/or multipropeller and -rotor aircraft.

In other words, the present invention principally relates to a multiple thrust configuration with rotors/propellers that define rotor/propeller planes, which can be selected to be positioned atop of each other individually, a shrouding for enclosing any rotating parts of at most one of the rotors/propellers, at least one electrical engine which drives each rotor/propeller, wherein each engine can be segregated in order to increase a provided safety level, and wherein a logic connection preferably exists between battery and electrical engines, the logic connection preferentially comprising a redundant design increasing the safety level in case of failure, and wherein preferably a battery redundancy layout with an appropriate safety level in case of failure is provided.

Advantageously, the inventive multirotor aircraft is designed for transportation of passengers and is, in particular, suitable and adapted for being certificated for operation within urban areas. It is preferably easy to fly, has multiple redundancies, meets the safety demands of the authorities, is cost efficient in design and only creates comparatively low noise. Preferably, the inventive multirotor aircraft has a comparatively small rotor diameter with a light weight design and a fixed angle of incident, and is nevertheless adapted for fulfilment of an emergency landing, although these rotor characteristics lead to a comparatively low inertia and a non-adjustable torque in operation.

According to one aspect, the inventive multirotor aircraft is capable of hovering and comprises a distributed propulsion system. It is further preferably designed with autorotation capability, which is necessary amongst other requirements in order to meet authority regulations, such as e.g. FAR and EASA regulations, regarding safety failure modes that amount up to approximately $1*10^{-7}$ failures per flight hour for the entire multirotor aircraft. In the aeronautical sector, these safety levels are typically defined by the so-called Design Assurance Levels (DAL) A to D.

Preferably, the inventive multirotor aircraft fulfils the authorities' regulation safety level needed to transport passengers. This is preferentially achieved by a combination and correlation of:

at least two individual rotor assemblies per thrust producing unit, a redundant, segregated battery layout, a redundant power supply and harness layout, a physical separation and segregation of an underlying power management, redundant, segregated electrical engines, and pitch control and/or RPM control of the rotor assemblies.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 7 shows a partly transparent side view of the thrust producing unit of FIG. 5 and FIG. 6 during vertical take-off and forward flight of the multirotor aircraft of FIG. 1 to FIG. 4.

DETAILED DESCRIPTION OF THE INVENTION

Figure 1:
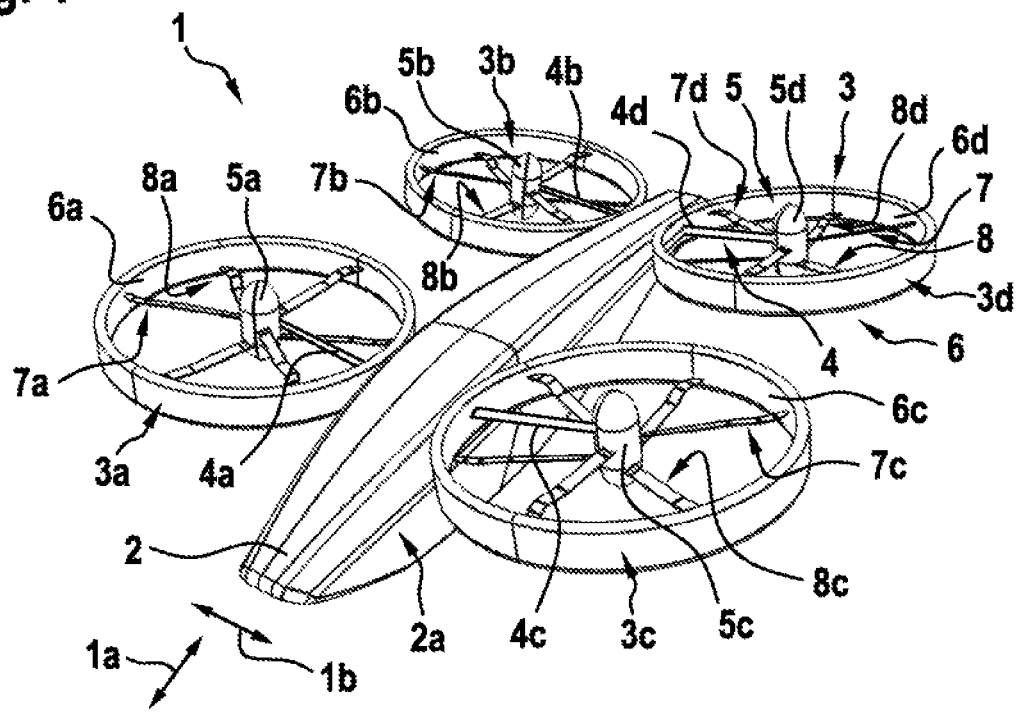
FIG. 1 shows a perspective view of a multirotor aircraft with a plurality of exemplary thrust producing units.

FIG. 1 shows a multirotor aircraft 1 with an aircraft airframe 2 according to the present invention. The aircraft airframe 2 defines a supporting structure that is also referred to hereinafter as the fuselage of the multirotor aircraft 1.

The fuselage 2 has an extension in longitudinal direction 1a and an extension in lateral direction 1b and preferably defines an internal volume 2a that is at least adapted for transportation of passengers, so that the multirotor aircraft 1 as a whole is adapted for transportation of passengers. The internal volume 2a is preferably further adapted for accommodating operational and electrical equipment, such as e.g. an energy storage system that is required for operation of the multirotor aircraft 1.

It should be noted that exemplary configurations of the internal volume 2a that are suitable for transportation of passengers, but also for accommodation of operational and electrical equipment, are readily available to the person skilled in the art and generally implemented to comply with applicable authority regulations and certification requirements regarding passenger transportation. Thus, as these configurations of the internal volume 2a as such are not part of the present invention, they are not described in detail for brevity and conciseness.

According to one aspect, the multirotor aircraft 1 comprises a plurality of thrust producing units 3. Preferably, the plurality of thrust producing units 3 comprises at least two and preferentially four thrust producing units 3a, 3b, 3c, 3d. The thrust producing units 3a, 3b, 3c, 3d are embodied for producing thrust (9 in FIG. 3) in operation, such that the multirotor aircraft 1 is able to hover in the air as well as to fly in any forward or rearward direction.

Preferably, the thrust producing units 3a, 3b, 3c, 3d are structurally connected to the fuselage 2. By way of example, this is achieved by means of a plurality of structural supports 4. More specifically, the thrust producing unit 3a is preferably connected to the fuselage 2 via a structural support 4a, the thrust producing unit 3b via a structural support 4b, the thrust producing unit 3c via a structural support 4c and the thrust producing unit 3d via a structural support 4d, wherein the structural supports 4a, 4b, 4c, 4d define the plurality of structural supports 4.

Preferably, at least one of the thrust producing units 3a, 3b, 3c, 3d comprises an associated shrouding in order to improve underlying aerodynamics and to increase operational safety. By way of example, a plurality of shrouding units 6 is shown with four separate shroudings 6a, 6b, 6c, 6d. Illustratively, the shrouding 6a is associated with the thrust producing unit 3a, the shrouding 6b with the thrust producing unit 3b, the shrouding 6c with the thrust producing unit 3c and the shrouding 6d with the thrust producing unit 3d.

The shroudings 6a, 6b, 6c, 6d can be made of a simple sheet metal. However, according to one aspect the shroudings 6a, 6b, 6c, 6d have a complex geometry, such as e.g. described below with reference to FIG. 5.

Furthermore, the shroudings 6a, 6b, 6c, 6d can be connected to the fuselage 2 together with the structural supports 4a, 4b, 4c, 4d, in order to reinforce the connection between the thrust producing units 3a, 3b, 3c, 3d and the fuselage 2. Alternatively, only the shroudings 6a, 6b, 6c, 6d can be connected to the fuselage 2.

According to one aspect, at least one and, preferably, each one of the thrust producing units 3a, 3b, 3c, 3d is equipped with at least two rotor assemblies. By way of example, the thrust producing unit 3a is equipped with two rotor assemblies 7a, 8a, the thrust producing unit 3b is equipped with two rotor assemblies 7b, 8b, the thrust producing unit 3c is equipped with two rotor assemblies 7c, 8c and the thrust producing unit 3d is equipped with two rotor assemblies 7d, 8d. The rotor assemblies 7a, 7b, 7c, 7d illustratively define a plurality of upper rotor assemblies 7 and the rotor assemblies 8a, 8b, 8c, 8d illustratively define a plurality of lower rotor assemblies 8.

The plurality of upper and lower rotor assemblies 7, 8 is preferably connected to the plurality of structural supports 4 by means of a plurality of gearbox fairings 5. Illustratively, the upper and lower rotor assemblies 7a, 8a are connected to the structural support 4a by means of a gearbox fairing 5a, the upper and lower rotor assemblies 7b, 8b are connected to the structural support 4b by means of a gearbox fairing 5b, the upper and lower rotor assemblies 7c, 8c are connected to the structural support 4c by means of a gearbox fairing 5c and the upper and lower rotor assemblies 7d, 8d are connected to the structural support 4d by means of a gearbox fairing 5d.

Preferably, each one of the upper rotor assemblies 7a, 7b, 7c, 7d defines an associated upper rotor plane (21 in FIG. 7) and each one of the lower rotor assemblies 8a, 8b, 8c, 8d defines an associated lower rotor plane (22 in FIG. 7). Preferably, the upper and lower rotor assemblies 7a, 7b, 7c, 7d, 8a, 8b, 8c, 8d define pairs of upper and lower rotor assemblies 7a, 8a; 7b, 8b; 7c, 8c; 7d, 8d that are accommodated in the shroudings 6a, 6b, 6c, 6d, respectively, so that the associated upper and lower rotor planes (21, 22 in FIG. 7) are located inside the shroudings 6a, 6b, 6c, 6d of the multirotor aircraft 1.

According to one aspect, the multirotor aircraft 1 comprises an aircraft operating structure and a redundant security architecture. The aircraft operating structure is preferably adapted for operation of the multirotor aircraft 1 in failure-free operating mode and the redundant security architecture is preferably at least adapted for operation of the multirotor aircraft 1 in case of a failure of the aircraft operating structure. In particular, the redundant security architecture is provided to comply preferentially with applicable authority regulations and certification requirements regarding passenger transportation.

Preferably, the aircraft operating structure comprises at least a first part of the upper and lower rotor assemblies 7a, 7b, 7c, 7d, 8a, 8b, 8c, 8d and the redundant security architecture comprises at least a second part of the upper and lower rotor assemblies 7a, 7b, 7c, 7d, 8a, 8b, 8c, 8d. Preferentially, a first one of the upper and lower rotor assemblies 7a, 8a, 7b, 8b, 7c, 8c, 7d, 8d of each thrust producing unit 3a, 3b, 3c, 3d is associated with the aircraft operating structure, while a second one is associated with the redundant security architecture. By way of example, the upper rotor assemblies 7a, 7b, 7c, 7d are associated with the aircraft operating structure and the lower rotor assemblies 8a, 8b, 8c, 8d are associated with the redundant security architecture. Thus, at least in case of a failure of the upper rotor assemblies 7a, 7b, 7c, 7d, the lower rotor assemblies 8a, 8b, 8c, 8d operate the multirotor aircraft 1 in order to avoid e.g. a crash thereof.

It should, however, be noted that the above configuration, wherein the upper rotor assemblies 7a, 7b, 7c, 7d are associated with the aircraft operating structure and the lower rotor assemblies 8a, 8b, 8c, 8d are associated with the redundant security architecture, is merely described by way of example and not for limiting the invention thereto. Instead, alternative associations are likewise possible and contemplated. For instance, the rotor assemblies 7a, 7c, 8b, 8d can be associated with the aircraft operating structure, while the rotor assemblies 8a, 8c, 7b, 7d are associated with the redundant security architecture. Alternatively, all upper and lower rotor assemblies 7a, 7b, 7c, 7d, 8a, 8b, 8c, 8d can be associated with the aircraft operating structure and/or the redundant security architecture, and so on. As such alternative associations are readily available to the person skilled in the art, they are likewise contemplated and considered as being part of the present invention.

Figure 2:
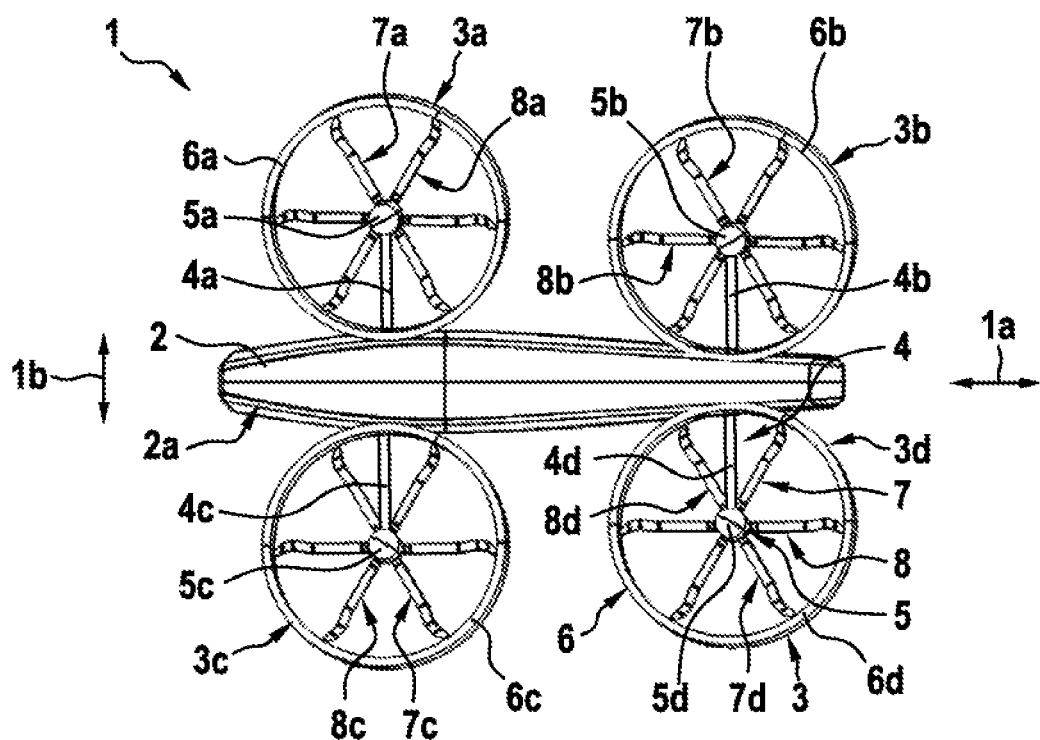
FIG. 2 shows a top view of the multirotor aircraft of FIG. 1.

FIG. 2 shows the multirotor aircraft 1 of FIG. 1 with the thrust producing units 3a, 3b, 3c, 3d that are connected to the fuselage 2. The thrust producing units 3a, 3b, 3c, 3d respectively comprise the upper and lower rotor assemblies 7a, 7b; 7b, 8b; 7c, 8c; 7d, 8d, which are preferably arranged in a side-by-side configuration with congruent rotor axes (12 in FIG. 3 and FIG. 4). Preferentially, the upper rotor assemblies 7a, 7b, 7c, 7d are arranged above the lower rotor assemblies 8a, 8b, 8c, 8d such that the upper and lower rotor assemblies 7a, 7b; 7b, 8b; 7c, 8c; 7d, 8d are stacked, i.e. arranged on top of each other with congruent rotor axes (12 in FIG. 3 and FIG. 4). However, alternative configurations are likewise contemplated, such as e.g. axially displaced rotor axes.

As can further be seen from FIG. 2, the thrust producing units 3a, 3b, 3c, 3d are all exemplarily arranged laterally with respect to the fuselage 2, i.e. on the left or right side of the fuselage 2 seen in its longitudinal direction 1a. Illustratively, the left side corresponds to the lower side and the right side to the upper side of the fuselage 2 as shown in FIG. 2. Furthermore, the fuselage 2 is exemplarily embodied such that the laterally arranged thrust producing units 3a, 3b, 3c, 3d define at least approximately a trapezoidal shape.

However, it should be noted that this exemplary arrangement is only described by way of example and not for limiting the present invention thereto. Instead, other arrangements are also possible and likewise contemplated. For instance, two of the thrust producing units 3a, 3b, 3c, 3d can respectively be arranged at a front and rear section of the fuselage 2, and so on.

Figure 3:
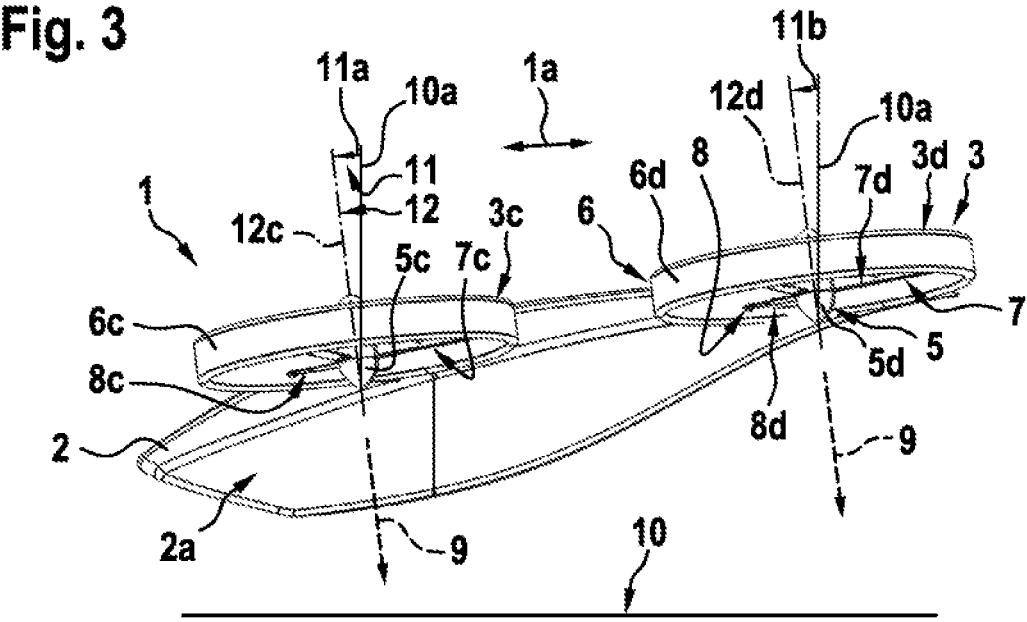
FIG. 3 shows a side view of the multirotor aircraft of FIG. 1 and FIG. 2 during forward flight.

FIG. 3 shows the multirotor aircraft 1 of FIG. 1 and FIG. 2 in an exemplary failure-free operating mode. In this exemplary failure-free operating mode, the plurality of thrust producing units 3 produce airstreams in a thrust producing airstream direction 9 by means of the plurality of upper and/or lower rotor assemblies 7, 8, which are suitable to lift the multirotor aircraft 1 off ground 10.

Each one of the plurality of upper rotor assemblies 7 defines a first rotor axis and each one of the plurality of lower rotor assemblies 8 defines a second rotor axis. Preferably, the first and second rotor axes are respectively congruent, i.e. coaxially arranged, so that the plurality of upper and lower rotor assemblies 7, 8 define a plurality of coaxially arranged rotor axes 12. Illustratively, the upper and lower rotor assemblies 7c, 8c define first and second congruent rotor axes, which are commonly referred to as the rotor axis 12c, and the upper and lower rotor assemblies 7d, 8d define first and second congruent rotor axes, which are commonly referred to as the rotor axis 12d.

However, other configurations are likewise contemplated. E.g. the rotor axes can be arranged in parallel to each other, and so on.

Preferably, the plurality of thrust producing units 3 is inclined in the longitudinal direction 1a of the multirotor aircraft 1 by a plurality of longitudinal inclination angles 11 in order to increase the maneuverability of the multirotor aircraft 1 and to reduce an overall inclination in the longitudinal direction 1a of the multirotor aircraft 1 during forward flight. The plurality of longitudinal inclination angles 11 is illustratively defined between a vertical reference line 10a of the multirotor aircraft 1 and the plurality of coaxially arranged rotor axes 12. Preferably, a possible and realized number of the plurality of longitudinal inclination angles 11 depends on an underlying number of provided thrust producing units.

More specifically, according to one aspect, at least one of the plurality of thrust producing units 3 is inclined in the longitudinal direction 1a of the multirotor aircraft 1 by a first longitudinal inclination angle defined between a vertical reference line 10a of the multirotor aircraft 1 and the first and second congruent rotor axes of this at least one of the plurality of thrust producing units 3. The first longitudinal inclination angle is preferably comprised in a range between −45° and +80° and preferentially amounts to 7°.

Illustratively, the thrust producing unit 3c of the plurality of thrust producing units 3 is inclined by a first longitudinal inclination angle 11a defined between the vertical reference line 10a and the rotor axis 12c, wherein the first longitudinal inclination angle 11a is preferably comprised in a range between −45° and +80°, and preferentially amounts to 7°. However, it should be noted that the thrust producing unit 3a of the plurality of thrust producing units 3 of FIG. 1 and FIG. 2 is preferably also inclined by the first longitudinal inclination angle 11a.

According to one aspect, at least one of the plurality of thrust producing units 3 is inclined in the longitudinal direction 1a of the multirotor aircraft 1 by a second longitudinal inclination angle defined between the vertical reference line 10a and the first and second congruent rotor axes of this at least one of the plurality of thrust producing units 3. The second longitudinal inclination angle is preferably also comprised in a range between −45° and +80°, and preferentially amounts to 7°.

Illustratively, the thrust producing unit 3d of the plurality of thrust producing units 3 is inclined by a second longitudinal inclination angle 11b defined between the vertical reference line 10a and the rotor axis 12d, wherein the second longitudinal inclination angle 11b is preferably comprised in a range between −45° and +80°, and preferentially amounts to 7°. However, it should be noted that the thrust producing unit 3b of the plurality of thrust producing units 3 of FIG. 1 and FIG. 2 is preferably also inclined by the second longitudinal inclination angle 11b.

Figure 4:
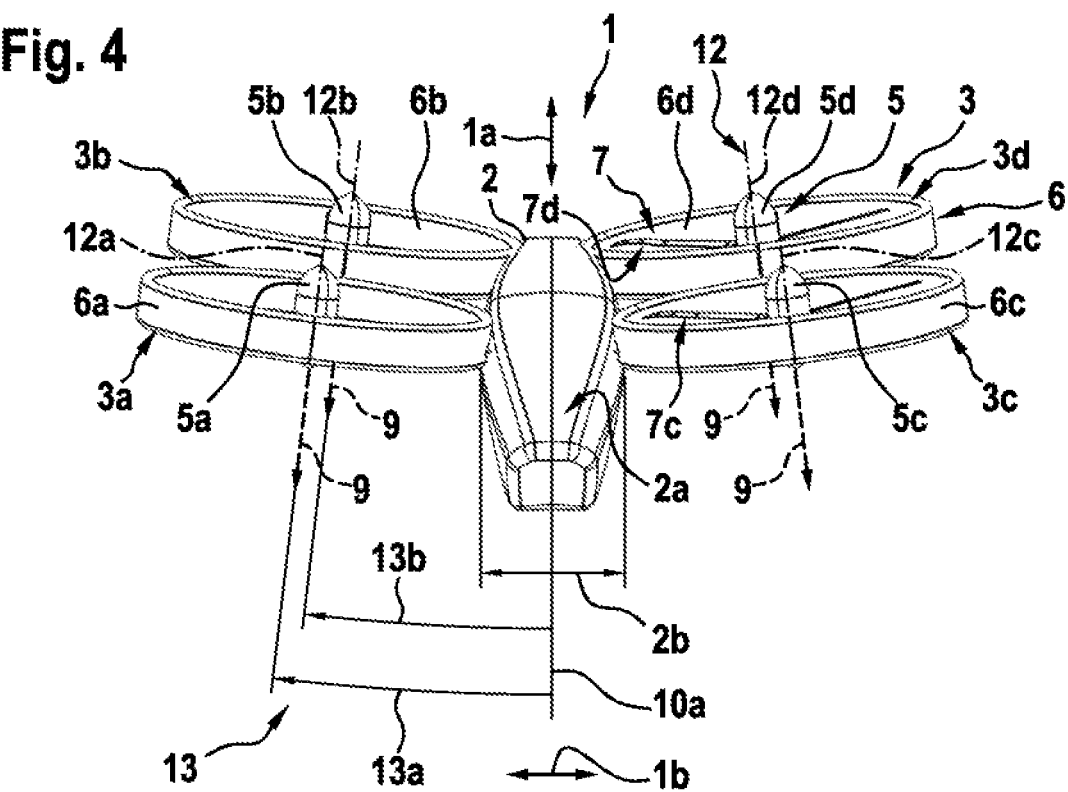
FIG. 4 shows a front view of the multirotor aircraft of FIG. 3.

FIG. 4 shows the multirotor aircraft 1 with the fuselage 2 of FIG. 3, which illustratively comprises a width 2b. The latter is defined as a maximum distance measured orthogonally to the longitudinal direction 1a of the multirotor aircraft 1 between the respective outmost left hand and right hand side surfaces of the fuselage 2.

The multirotor aircraft 1 is again exemplarily shown in the failure-free operating mode, wherein the plurality of thrust producing units 3 produce airstreams in the thrust producing airstream direction 9 by means of the plurality of upper and lower rotor assemblies 7, 8. The upper and lower rotor assemblies 7c, 8c define the rotor axis 12c and the upper and lower rotor assemblies 7d, 8d define the rotor axis 12d as described above with reference to FIG. 3.

Furthermore, the upper and lower rotor assemblies 7a, 8a exemplarily define first and second congruent rotor axes, which are commonly referred to as the rotor axis 12a, and the upper and lower rotor assemblies 7b, 8b define first and second congruent rotor axes, which are commonly referred to as the rotor axis 12b. It should be noted that the rotor axes 12a, 12b, 12c, 12d are preferably implemented in order to reduce the overall complexity, system weight as well as geometrical size of the multirotor aircraft 1.

Preferably, the plurality of thrust producing units 3 is inclined in the lateral direction 1b of the multirotor aircraft 1 by a plurality of lateral inclination angles 13 in order to provide reduced gust sensitivity and to increase the maneuverability of the multirotor aircraft 1. The plurality of lateral inclination angles 13 is illustratively defined between the vertical reference line 10a of the multirotor aircraft 1 and the plurality of coaxially arranged rotor axes 12. Preferably, a possible and realized number of the plurality of lateral inclination angles 13 depends on an underlying number of provided thrust producing units.

More specifically, according to one aspect, at least one of the plurality of thrust producing units 3 is inclined in the lateral direction 1b of the multirotor aircraft 1 by a first lateral inclination angle defined between the vertical reference line 10a of the multirotor aircraft 1 and the first and second congruent rotor axes of this at least one of the plurality of thrust producing units 3. The first lateral inclination angle is preferably comprised in a range between −45° and +80°, and preferentially amounts to 5°.

Illustratively, the thrust producing unit 3a of the plurality of thrust producing units 3 is inclined by a first lateral inclination angle 13a defined between the vertical reference line 10a and the rotor axis 12a, wherein the first lateral inclination angle 13a is preferably comprised in a range between −45° and +80°, and preferentially amounts to 5°. However, it should be noted that the thrust producing unit 3c of the plurality of thrust producing units 3 of FIG. 1 and FIG. 2 is preferably also inclined by the first lateral inclination angle 13a.

According to one aspect, at least one of the plurality of thrust producing units 3 is inclined in the lateral direction 1b of the multirotor aircraft 1 by a second lateral inclination angle defined between the vertical reference line 10a of the multirotor aircraft 1 and the first and second congruent rotor axes of this at least one of the plurality of thrust producing units 3. The second lateral inclination angle is preferably comprised in a range between −45° and +80°, and preferentially amounts to 5°.

Illustratively, the thrust producing unit 3b of the plurality of thrust producing units 3 is inclined by a second lateral inclination angle 13b defined between the vertical reference line 10a and the rotor axis 12b, wherein the second lateral inclination angle 13b is preferably comprised in a range between −45° and +80°, and preferentially amounts to 5°. However, it should be noted that the thrust producing unit 3d of the plurality of thrust producing units 3 of FIG. 1 and FIG. 2 is preferably also inclined by the second lateral inclination angle 13b.

Figure 5:
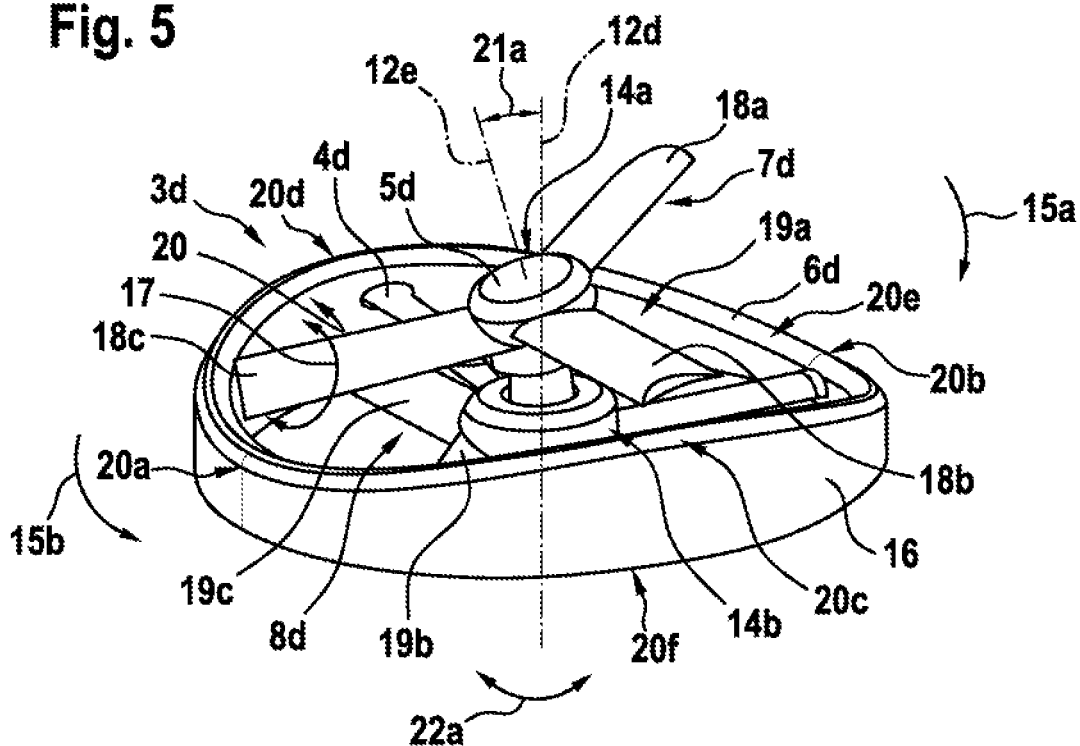
FIG. 5 shows a perspective view of a thrust producing unit of the multirotor aircraft of FIG. 1 to FIG. 4 with a shrouding according to the present invention.

FIG. 5 shows the thrust producing unit 3d of the preceding figures, with its upper rotor assembly 7d, its lower rotor assembly 8d, its gearbox fairing 5d and its shrouding 6d, for further illustrating an exemplary configuration thereof. It should, however, be noted that the thrust producing units 3a, 3b, 3c of the preceding figures preferably comprise similar configurations, so that the thrust producing unit 3d is only described representative for all thrust producing units 3a, 3b, 3c, 3d, for brevity and conciseness.

Preferably, the shrouding 6d is configured with a supporting structure 16 that can be made of a simple pressed, bended metal sheet. The supporting structure 16 is preferentially provided with an internal volume that can e.g. be used as storage volume for a battery system of the multirotor aircraft 1 of the preceding figures. Illustratively, the shrouding 6d and, more specifically, the supporting structure 16 accommodates at most one and, exemplarily, the lower rotor assembly 8d. Illustratively, the lower rotor assembly 8d comprises at least two and, exemplarily, three rotor blades 19a, 19b, 19c for producing thrust in operation. Similarly, the upper rotor assembly 7d preferably also comprises at least two and, exemplarily, three rotor blades 18a, 18b, 18c for producing thrust in operation.

Furthermore, preferably at least one first engine 14a is provided for driving the rotor blades 18a, 18b, 18c, i.e. the upper rotor assembly 7d, in operation and at least one second engine 14b is provided for driving the rotor blades 19a, 19b, 19c, i.e. the lower rotor assembly 8d, in operation. The at least one first engine 14a is preferably associated with the aircraft operating structure described above with reference to FIG. 1, and the at least one second engine 14b is preferably associated with the redundant security architecture described above with reference to FIG. 1. Illustratively, the at least one first and second engines 14a, 14b are arranged inside of and, thus, encompassed by the gearbox fairing 5d.

It should be noted that optionally one or more gearboxes can be introduced between the at least one first and second engines 14a, 14b and the rotor blades 18a, 18b, 18c respectively 19a, 19b, 19c. By such an optional introduction of one or more gearboxes, an operating efficiency of the at least one first and second engines 14a, 14b can be increased since their rotational speed is increased.

It should further be noted that the at least one first and second engines 14a, 14b can be implemented by any suitable engine that is capable of producing torque in operation, such as a turbine, diesel engine, Otto-motor, electrical engine and so on, and that can be connected to the rotor blades 18a, 18b, 18c respectively 19a, 19b, 19c for rotating these rotor blades 18a, 18b, 18c respectively 19a, 19b, 19c, i.e. the upper and lower rotor assemblies 7d respectively 8d, in operation. However, as such engines are well-known to the person skilled in the art and not part of the present invention, they are not described in greater detail for brevity and conciseness.

Preferably, the upper rotor assembly 7d is adapted to be rotated in a first rotation direction 15a around a first rotor axis 12e in operation. Similarly, the lower rotor assembly 8d is adapted to be rotated in a second rotation direction 15b around the rotor axis 12d, which illustratively defines a second rotor axis, in operation. Illustratively, the first and second rotation directions 15a, 15b are preferably opposed to each other.

According to one aspect, the first and second rotor axes 12e, 12d can be inclined by associated inclination angles 21a, 22a with respect to a respective longitudinal direction of the shrouding 6d, which illustratively corresponds to the second rotor axis 12d. The associated inclination angles 21a, 22a are preferably comprised in a range between −60° and +60°. More specifically, the associated inclination angle 21a is preferably comprised in a range between −10° and +45°, and the associated inclination angle 22a is preferably comprised in a range between −5° and +5°. Illustratively, the first rotor axis 12e and, thus, the upper rotor assembly 7d, is inclined by the associated inclination angle 21a of exemplarily approximately 30° with respect to the second rotor axis 12d and, thus, the lower rotor assembly 8d.

At least the upper rotor assembly 7d and, more specifically, its rotor blades 18a, 18b, 18c, may be provided with an optional pitch variation 17. Similarly, the lower rotor assembly 8d, i.e. its rotor blades 19a, 19b, 19c, may also be provided with such an optional pitch variation. In this case, control of the produced airstream in the thrust producing airstream direction 9 of FIG. 3 and FIG. 4 can either be achieved in operation by means of pitch variation, by means of RPM variation or by means of a combination of pitch and RPM variation.

In contrast, if the upper and lower rotor assemblies 7d, 8d are not provided with such an optional pitch variation, e.g. if the rotor blades 18a, 18b, 18c respectively 19a, 19b, 19c are implemented as fixed pitch blades, control of the produced airstream in the thrust producing airstream direction 9 of FIG. 3 and FIG. 4 in operation by means of pitch variation cannot by performed. In this case, only RPM variation can be used for control of the airstream in the thrust producing airstream direction 9 of FIG. 3 and FIG. 4 that is produced by the upper and lower rotor assembly 7d, 8d in operation.

Preferably, each one of the upper and lower rotor assemblies 7d, 8d is individually sized and comprises a diameter that ranges from 0.05 to 6 times of the fuselage width 2b of FIG. 4, which is designated as W hereinafter for simplicity. In other words, the diameter of each one of the upper and lower rotor assemblies 7d, 8d preferably ranges from 0.05*W to 6*W, and preferentially amounts to 1.5*W.

According to one aspect, the shrouding 6d defines a cylindrical air duct 20, which is illustratively radially delimited by the supporting structure 16. The cylindrical air duct 20 is preferably axially delimited by an air inlet region 20e and an air outlet region 20f. Outside of the cylindrical air duct 20 and preferably adjacent to the air inlet region 20e of the cylindrical air duct 20 is preferably arranged the first rotor assembly 7d.

It should be noted that the air duct 20 is only by way of example designated as a "cylindrical" air duct and not for limiting the present invention accordingly. In other words, while a "cylindrical" shaping of the air duct implies equal radii all along the air duct 20 from the air inlet region 20e to the air outlet region 20f, alternative configurations are likewise contemplated. For instance, the air duct 20 may exhibit the form of a frustum, such that its radius is e.g. greater at the air outlet region 20f than at the air inlet region 20e, and so on. Therefore, is should be understood that the expression "cylindrical air duct" is meant to encompass also such alternative configurations of the air duct 20.

The air inlet region 20e preferably exhibits in circumferential direction of the cylindrical air duct 20 an undulated geometry. More specifically, this undulated geometry implies that when moving in circumferential direction of the cylindrical air duct 20 along the air inlet region 20e, an undulated motion resp. a wave-shaped movement is performed.

Illustratively, the shrouding 6d, i.e. the cylindrical air duct 20, exhibits a leading edge 20a and a trailing edge 20b. Only for clarity, it should be noted that the leading edge 20a is the edge of the shrouding 6d, i.e. the cylindrical air duct 20, that is arranged during forward flight of the multirotor aircraft of FIG. 1 to FIG. 4 in an upstream position with respect to the trailing edge 20b. Furthermore, the shrouding 6d, i.e. the cylindrical air duct 20, preferentially exhibits a board side lateral shoulder 20c and a star board side lateral shoulder 20d that are located at the air inlet region 20e.

More specifically, the leading edge 20a is diametrically opposed to the trailing edge 20b in circumferential direction of the shrouding 6d, i.e. the cylindrical air duct 20, and the board side lateral shoulder 20c is diametrically opposed to the star board side lateral shoulder 20d. Furthermore, the board side lateral shoulder 20c and the star board side lateral shoulder 20d are respectively arranged between the leading edge 20a and the trailing edge 20b in circumferential direction of the shrouding 6d, i.e. the cylindrical air duct 20.

Figure 6:
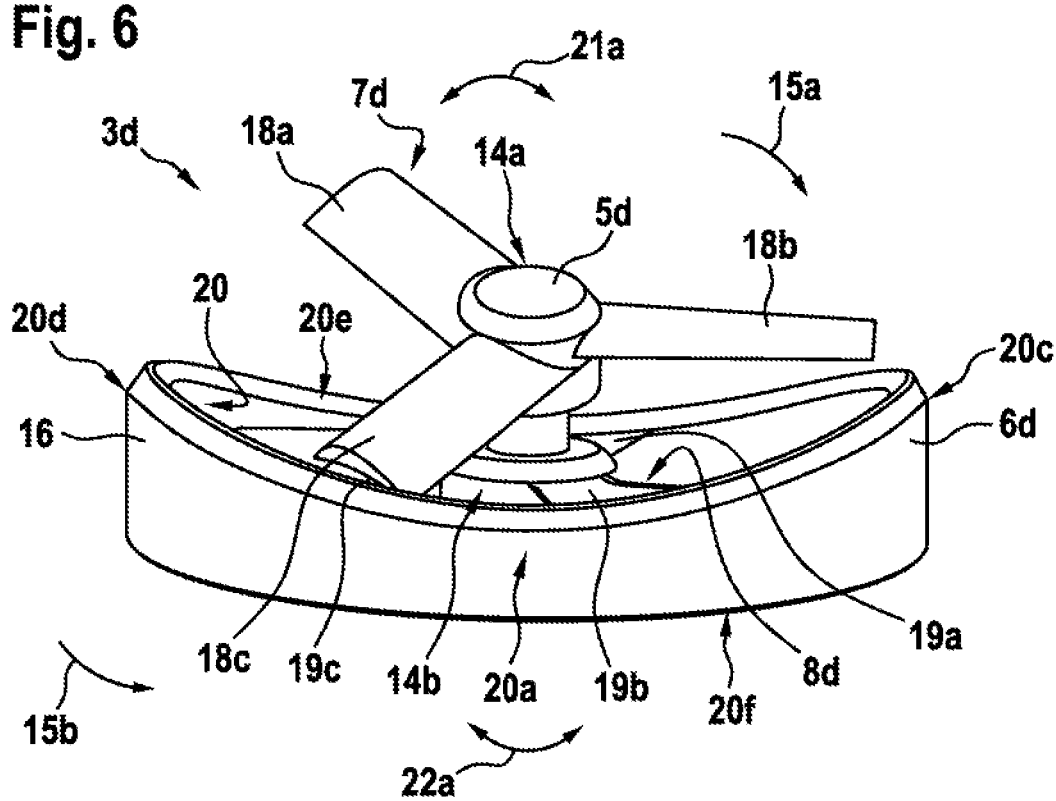
FIG. 6 shows a front view of the thrust producing unit of FIG. 5.

FIG. 6 shows the thrust producing unit 3d of FIG. 5, with its upper rotor assembly 7d, its lower rotor assembly 8d and its shrouding 6d that defines the cylindrical air duct 20, which is preferably axially delimited by the air inlet region 20e and the air outlet region 20f, for further illustrating the undulated geometry of the air inlet region 20e. FIG. 6 also further illustrates the inclination of the upper rotor assembly 7d by the associated inclination angle 21a with respect to the lower rotor assembly 8d.

FIG. 7 shows a schematic view of the thrust producing unit 3d of FIG. 5 and FIG. 6 with the upper and lower rotor assemblies 7d, 8d, which preferentially rotate around their respective rotor axes 12e, 12d. Preferably, the upper and lower rotor assemblies 7d, 8d define separated rotor planes 21, 22 in order to reach a required safety level and a satisfying flight mechanical behaviour. Illustratively, the rotor planes 21, 22 are arranged on top of each other. Preferentially, a predetermined distance between the rotor planes 21, 22 is comprised in a range between 0.01*DR and 2*DR, and preferably amounts to 0.17*DR, wherein DR defines a diameter of the second rotor assembly 8d.

As described above, the shrouding 6d defines the cylindrical air duct 20 that is axially delimited by the air inlet region 20e and the air outlet region 20f. The lower rotor assembly 8d is arranged inside of the shrouding 6d and the upper rotor assembly 7d is arranged outside of the shrouding 6d, i.e. outside of the cylindrical air duct 20 and, preferably, adjacent to the air inlet region 20e.

In operation of the thrust producing unit 3d, the air inlet region 20e preferably functions as an air collector and is, therefore, hereinafter also referred to as the "collector 20e", for simplicity and clarity. The air outlet region 20f may be embodied and function as a diffusor, but not necessarily, and is therefore hereinafter also referred to as the "diffusor 20f", for simplicity and clarity.

Part (A) of FIG. 7 illustrates an exemplary operation of the thrust producing unit 3d in axial air flow conditions, i.e. during vertical take-off and hovering of the multirotor aircraft 1 of FIG. 1 to FIG. 4. However, in contrast to FIG. 5 and FIG. 6, the rotor axes 12e, 12d are exemplarily arranged coaxially to each other.

Illustratively, in the axial air flow conditions, an axial airstream 23a enters the cylindrical air duct 20 via the collector 20e, is accelerated by means of the upper and lower rotor assemblies 7d, 8d and exits the cylindrical air duct 20 via the diffusor 20f. It should be noted that the airstream 23a is referred to as an "axial" airstream as it is at least approximately oriented in parallel to the coaxially arranged rotor axes 12e, 12d.

The axial airstream 23a by itself produces thrust and further produces an additional thrust by acting on the shrouding 6d, i.e. the cylindrical air duct 20. This will lead to a total thrust illustrated by a thrust vector 23, which will allow the multirotor aircraft 1 of FIG. 1 to FIG. 4 to be lifted. It should be noted that at the same thrust level, a respective amount of power needed by the at least one first and second engines 14a, 14b of FIG. 5 and FIG. 6 for driving the upper and lower rotor assemblies 7d, 8d will be significantly lower than the power that would be needed to drive the upper and lower rotor assemblies 7d, 8d without the shrouding 6d.

Part (B) of FIG. 7 illustrates an exemplary operation of the thrust producing unit 3d in transversal air flow conditions, i.e. during forward flight of the multirotor aircraft 1 of FIG. 1 to FIG. 4. The rotor axes 12e, 12d are illustratively still arranged coaxially to each other according to part (A), but now a transversal airstream 23b enters the cylindrical air duct 20 via the collector 20e, is accelerated by means of the upper and lower rotor assemblies 7d, 8d and exits the cylindrical air duct 20 via the diffusor 20f. It should be noted that the airstream 23b is referred to as a "transversal" airstream, as it is at least approximately oriented in a direction transversal to the coaxially arranged rotor axes 12e, 12d.

In order to allow forward flight of the multirotor aircraft 1 of FIG. 1 to FIG. 2 with the thrust producing unit 3d according to part (B), preferably RPM variation is used for control of the transversal airstream 23b in the cylindrical air duct 20. More specifically, the upper rotor assembly 7d is preferably rotated around the rotor axis 12e with a higher rotational speed than the lower rotor assembly 8d around the rotor axis 12d. Thus, an underlying direction of the total thrust illustrated by the thrust vector 23, which is still shown as in part (A), will be re-oriented as illustrated in part (C) in order to allow the forward flight of the multirotor aircraft 1 of FIG. 1 to FIG. 4.

Part (C) of FIG. 7 illustrates another exemplary operation of the thrust producing unit 3d in transversal air flow conditions, i.e. during forward flight of the multirotor aircraft 1 of FIG. 1 to FIG. 4 according to the present invention, wherein the transversal airstream 23b according to part (B) enters the cylindrical air duct 20 via the collector 20e, is accelerated by means of the upper and lower rotor assemblies 7d, 8d and exits the cylindrical air duct 20 via the diffusor 20f. However, in contrast to part (B) the rotor axis 12e is now inclined by the inclination angle 21a, as described above with reference to FIG. 5 and FIG. 6. Thus, the thrust vector 23 is re-oriented as exemplarily illustrated in order to allow for enhanced forward flight conditions of the multirotor aircraft 1 of FIG. 1 to FIG. 4.

Figure 8:
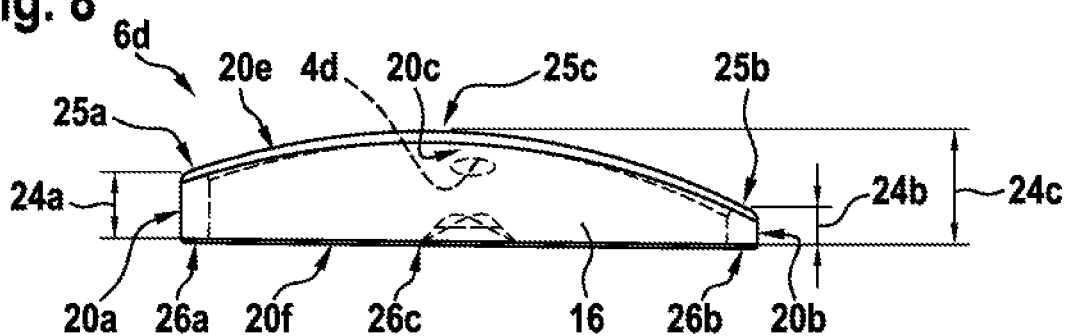
FIG. 8 shows a partly transparent side view of the shrouding of FIG. 5 to FIG. 7.

FIG. 8 shows another schematic view of the thrust producing unit 3d of FIG. 5 and FIG. 6 with the shrouding 6d that defines the cylindrical air duct 20, which is preferably axially delimited by the collector 20e and the diffusor 20f and which comprises the leading edge 20a, the trailing edge 20b, the board side lateral shoulder 20c and the star board side lateral shoulder 20d. However, for purposes of simplicity and clarity, illustration of the upper and lower rotor assemblies 7d, 8d was omitted.

According to one aspect, the cylindrical air duct 20 exhibits a height defined between the diffusor 20f and the collector 20e in axial direction of the cylindrical air duct 20 that varies in circumferential direction of the cylindrical air duct 20. This height varies in the circumferential direction of the cylindrical air duct 20 and, thus, defines the undulated geometry of the collector 20e as described above with reference to FIG. 5.

More specifically, a height 24a at the leading edge 20a is preferably smaller than a height 24c at the board side lateral shoulder 20c and/or the star board side lateral shoulder 20d. Furthermore, a height 24b at the trailing edge 20b is preferably smaller than the height 24c at the board side lateral shoulder 20c and/or the star board side lateral shoulder 20d. Moreover, the height 24b at the trailing edge 20b is preferably smaller than the height 24a at the leading edge 20a. According to one aspect, the height 24c at the board side lateral shoulder 20c and/or the star board side lateral shoulder 20d is selected in a range from 0.05*D to 0.5*D, wherein D defines a diameter, preferably an inner diameter (20g in FIG. 10), of the cylindrical air duct 20.

According to one aspect, the collector 20e of the cylindrical air duct 20 exhibits a radius that varies in the circumferential direction of the cylindrical air duct 20. In other words, the collector 20e is preferably not provided with a flat upper edge, i.e. its edge that points away from the diffusor 20f, but with a rounded upper edge. Preferentially, the radius of the collector 20e, which is hereinafter also referred to as the "collector radius" for simplicity and clarity, differs between at least two of the leading edge 20a, the trailing edge 20b, the board side lateral shoulder 20c and the star board side lateral shoulder 20d.

Preferably, a collector radius 25a at the leading edge 20a is selected in a range from 0.01*D to 0.25*D, a collector radius 25b at the trailing edge 20b is selected in a range from 0 to 0.25*D, and a collector radius 25c at the board side lateral shoulder 20c and/or the star board side lateral shoulder 20d is selected in a range from 0.01*D to 0.25*D. As already mentioned above, D defines the diameter, preferably the inner diameter (20g in FIG. 10), of the cylindrical air duct 20.

Likewise, the diffusor 20f of the cylindrical air duct 20 may exhibit a radius that varies in the circumferential direction of the cylindrical air duct 20. In other words, the diffusor 20f is not necessarily provided as illustrated with a flat lower edge, i.e. its edge that points away from the collector 20e, but with a rounded lower edge. Preferentially, the radius of the diffusor 20f, which is hereinafter also referred to as the "diffusor radius" for simplicity and clarity, differs between at least two of the leading edge 20a, the trailing edge 20b, the board side lateral shoulder 20c and the star board side lateral shoulder 20d.

Preferably, a diffusor radius 26a at the leading edge 20a is selected in a range from 0 to 0.1*D, a diffusor radius 26b at the trailing edge 20b is selected in a range from 0 to 0.1*D, and a diffusor radius 26c at the board side lateral shoulder 20c and/or the star board side lateral shoulder 20d is selected in a range from 0 to 0.1*D. Again, as already mentioned above, D defines the diameter, preferably the inner diameter (20g in FIG. 10), of the cylindrical air duct 20.

Figure 9:
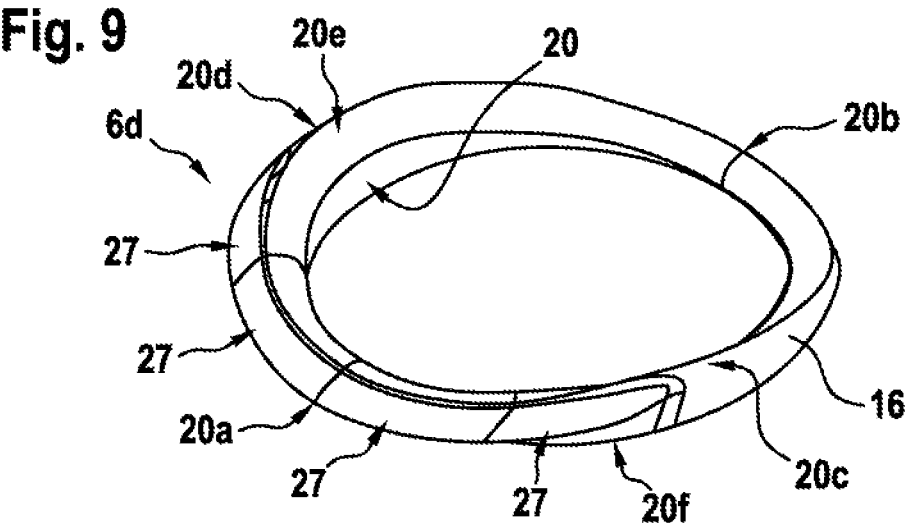
FIG. 9 shows a perspective view of the shrouding of FIG. 8.

FIG. 9 shows the shrouding 6d of FIG. 5 to FIG. 8 that defines the cylindrical air duct 20, which is preferably axially delimited by the collector 20e and the diffusor 20f and which comprises the leading edge 20a, the trailing edge 20b, the board side lateral shoulder 20c and the star board side lateral shoulder 20d. According to one aspect, the leading edge 20a is provided with an additional lifting surface 27.

Figure 10:
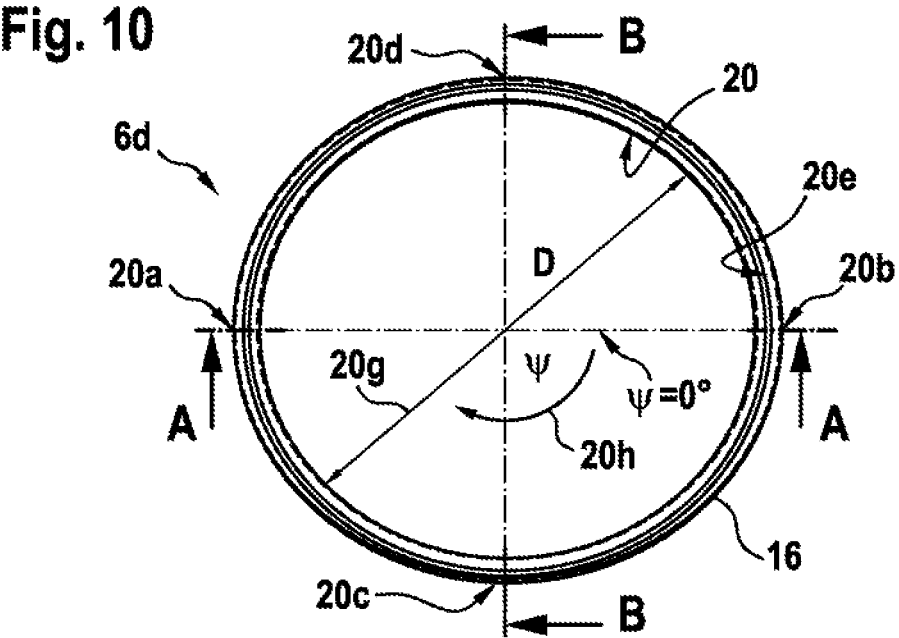
FIG. 10 shows a top view of the shrouding of FIG. 8 and FIG. 9.

FIG. 10 shows the shrouding 6d of FIG. 5 to FIG. 8 that defines the cylindrical air duct 20, which comprises the leading edge 20a, the trailing edge 20b, the board side lateral shoulder 20c and the star board side lateral shoulder 20d. Illustratively, a diameter and, more specifically, an inner diameter D of the cylindrical air duct 20, is labeled with the reference sign 20g. Furthermore, the azimuth $\psi$ of the cylindrical air duct 20, i.e. the shrouding 6d, is labeled with the reference sign 20h. By way of example, it is assumed that the azimuth $\psi$ is defined in clockwise direction of the shrouding 6d as illustrated and starts turning from the trailing edge 20b such that $\psi=0$ at the trailing edge 20b.

Figure 11:
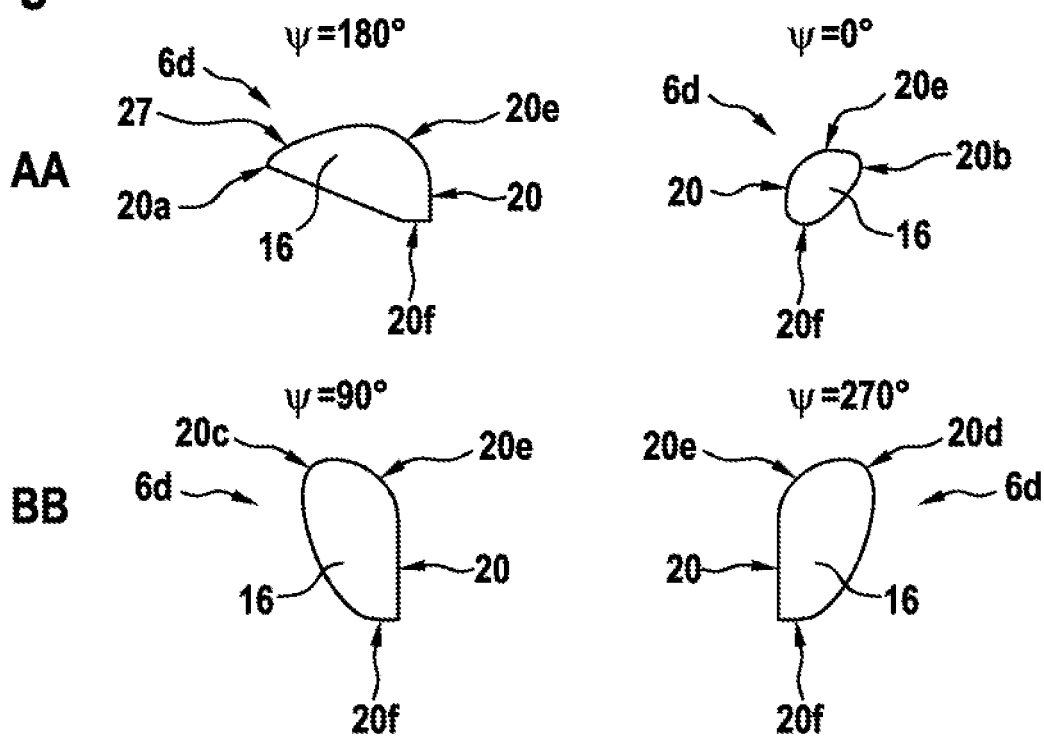
FIG. 11 shows exemplary cross-sections of the shrouding of FIG. 8 to FIG. 10.

FIG. 11 shows four exemplary cross-sections of the shrouding 6d that defines the cylindrical air duct 20, which is preferably axially delimited by the collector 20e and the diffusor 20f and which comprises the leading edge 20a, the trailing edge 20b, the board side lateral shoulder 20c and the star board side lateral shoulder 20d. Each cross-section corresponds to a sectional view of the shrouding 6d at a given azimuth $\psi$ of FIG. 10.

More specifically, a first sectional view illustrates an exemplary cross-section of the shrouding 6d at the azimuth $\psi=180°$ seen in direction of the cut line A-A of FIG. 10. This first sectional view illustrates the leading edge 20a of the shrouding 6d that is provided with the additional lifting surface 27 of FIG. 9. By way of example, the collector 20e is provided at the leading edge 20a as described above with reference to FIG. 8 with a rounded upper edge, while the diffusor 20f is illustratively provided with a flat lower edge.

A second sectional view illustrates an exemplary cross-section of the shrouding 6d at the azimuth $\psi=0°$ seen in direction of the cut line A-A of FIG. 10. This second sectional view illustrates the trailing edge 20b of the shrouding 6d. By way of example and as described above with reference to FIG. 8, the collector 20e is provided at the trailing edge 20b with a rounded upper edge and the diffusor 20f is provided with a rounded lower edge.

A third sectional view illustrates an exemplary cross-section of the shrouding 6d at the azimuth $\psi=90°$ seen in direction of the cut line B-B of FIG. 10. This third sectional view illustrates the board side lateral shoulder 20c of the shrouding 6d. By way of example, the collector 20e is provided at the board side lateral shoulder 20c as described above with reference to FIG. 8 with a rounded upper edge, while the diffusor 20f is illustratively provided with a flat lower edge.

A fourth sectional view illustrates an exemplary cross-section of the shrouding 6d at the azimuth $\psi=270°$ seen in direction of the cut line B-B of FIG. 10. This fourth sectional view illustrates the star board side lateral shoulder 20d of the shrouding 6d. By way of example, the collector 20e is provided at the star board side lateral shoulder 20d as described above with reference to FIG. 8 with a rounded upper edge, while the diffusor 20f is illustratively provided with a flat lower edge.

Figure 12:
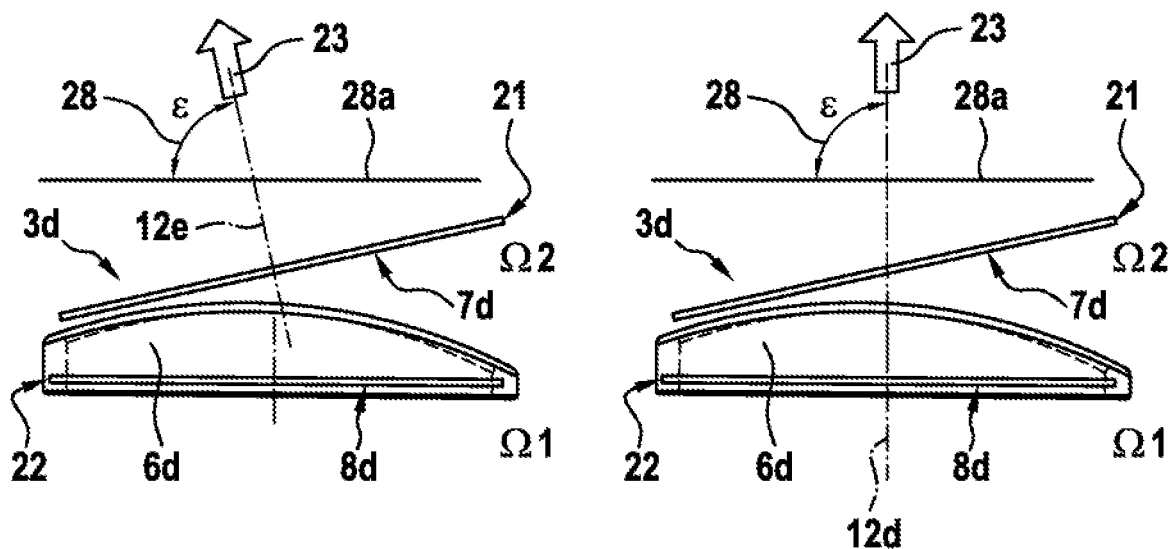
FIG. 12 shows a partly transparent side view of the thrust producing unit of FIG. 5 and FIG. 6 during vertical take-off and forward flight of the multirotor aircraft of FIG. 1 to FIG. 4.

FIG. 12 shows the thrust producing unit 3d of FIG. 5 and FIG. 6 according to Part (C) of FIG. 7, with the shrouding 6d and the upper and lower rotor assemblies 7d, 8d. The upper rotor assembly 7d rotates in operation around the rotor axis 12e and defines the rotor plane 21, and the lower rotor assembly 7d rotates in operation around the rotor axis 12d and defines the rotor plane 22. The rotor axis 12e is inclined with respect to the rotor axis 12d, as described above.

More specifically, FIG. 12 illustrates an exemplary control method for controlling the thrust producing unit 3d by means of RPM variation. In other words, if e.g. the upper rotor assembly 7d is operated with a rotational speed Ω2 that is higher than a rotational speed Ω1 of the lower rotor assembly 8d, the thrust vector 23 is inclined with respect to an exemplary reference plane 28a by an associated thrust orientation angle ε, which is labelled with the reference sign 28. As long as the associated thrust orientation angle ε is smaller than 90°, i.e. ε<90°, as illustrated on the left-hand side of FIG. 12, the multirotor aircraft 1 of FIG. 1 to FIG. 4 is operated in forward flight. If, however, the associated thrust orientation angle ε is equal to 90°, i.e. ε=90°, as illustrated on the right-hand side of FIG. 12, the multirotor aircraft 1 of FIG. 1 to FIG. 4 is operated in hover or vertical take-off.

However, it should be noted that this functioning also depends on a particular implementation of the upper and lower rotor assemblies 7d, 8d. More specifically, the required rotational speed differences may e.g. vary depending on pitch differences between the upper and lower rotor assemblies or the inclination between the rotor axis 12e and the rotor axis 12d, and so on. However, the detailed functioning is considered to be readily available to the person skilled in the art and, as such, not subject of the present invention. Therefore, a more detailed description thereof is omitted for brevity and conciseness.

Figure 13:
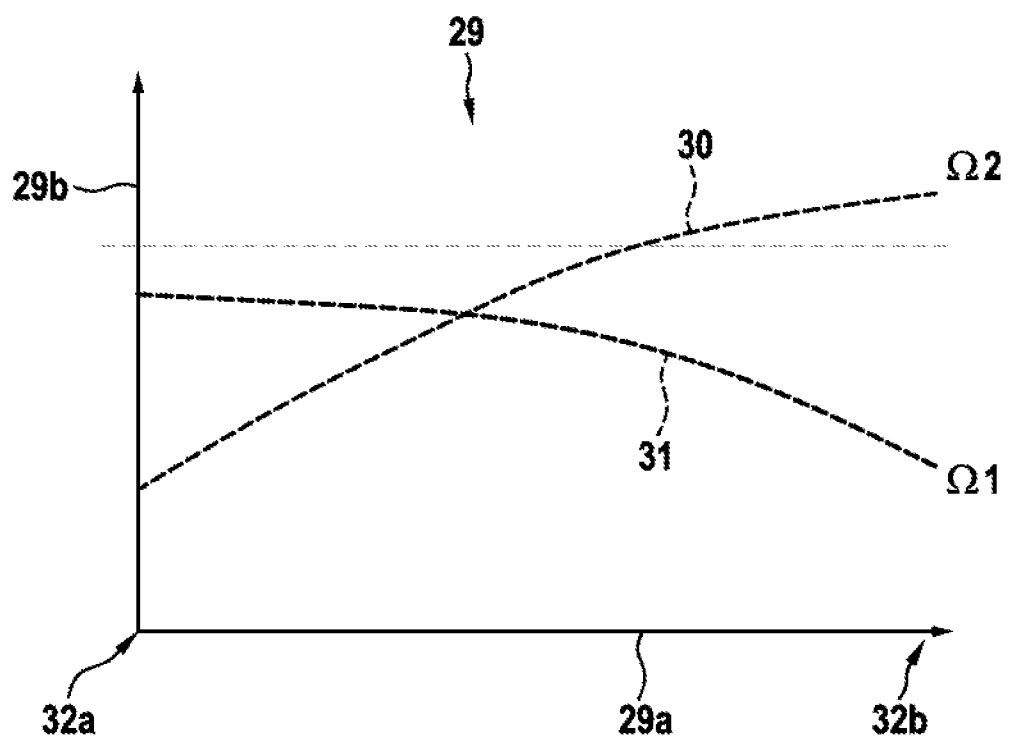
FIG. 13 shows a diagram illustrating an exemplary control method for controlling the multirotor aircraft of FIG. 1 to FIG. 4.

FIG. 13 shows an exemplary RPM offset control diagram 29 illustrating operation of the multirotor aircraft 1 of FIG. 1 to FIG. 4. The diagram 29 illustratively comprises a flight mode axis 29a and a rotational speed axis 29b.

In diagram 29, two graphs 30, 31 are illustratively represented. The graph 30 exemplifies the rotational speed Ω2 of the upper rotor assembly 7d of FIG. 12, and the graph 31 exemplifies the rotational speed Ω1 of the lower rotor assembly 8d of FIG. 12.

When operation of the multirotor aircraft 1 of FIG. 1 to FIG. 4 starts, the upper rotor assembly 7d is preferably operated with a rotational speed Ω2 that is lower than the rotational speed Ω1 of the lower rotor assembly 8d, as indicated with an arrow 32a. Thus, the multirotor aircraft 1 of FIG. 1 to FIG. 4 is operated in an associated hover mode, i.e. hovers.

Subsequently, the rotational speed Ω2 of the upper rotor assembly 7d is preferably increased and the rotational speed Ω1 of the lower rotor assembly 8d is preferably decreased. Then, when the upper rotor assembly 7d is operated with a rotational speed Ω2 that is higher than the rotational speed Ω1 of the lower rotor assembly 8d, the multirotor aircraft 1 of FIG. 1 to FIG. 4 is operated in an associated forward flight mode, as indicated with an arrow 32b.

Figure 14:
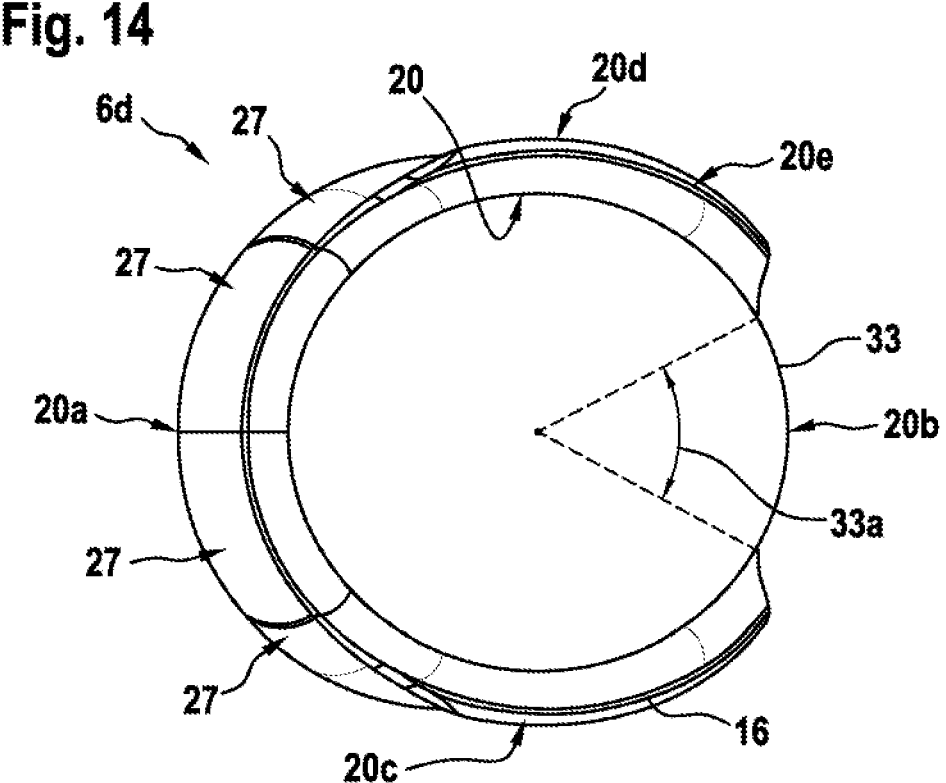
FIG. 14 shows a top view of the shrouding of FIG. 8 to FIG. 10 according to a first variant.

FIG. 14 shows the shrouding 6d of FIG. 5 to FIG. 12 that defines the cylindrical air duct 20, which comprises the leading edge 20a, the trailing edge 20b, the board side lateral shoulder 20c and the star board side lateral shoulder 20d. However, in contrast to the implementation of the shrouding 6d according to FIG. 5 to FIG. 12, the trailing edge 20b of the cylindrical air duct 20 is now at least essentially open and merely provided with a stiffening element 33. Preferably, the cylindrical air duct 20 is open at the trailing edge 20b over a predetermined opening angle 33a of e.g. 30° to 60°, which corresponds to an extension angle of the stiffening element 33.

Figure 15:
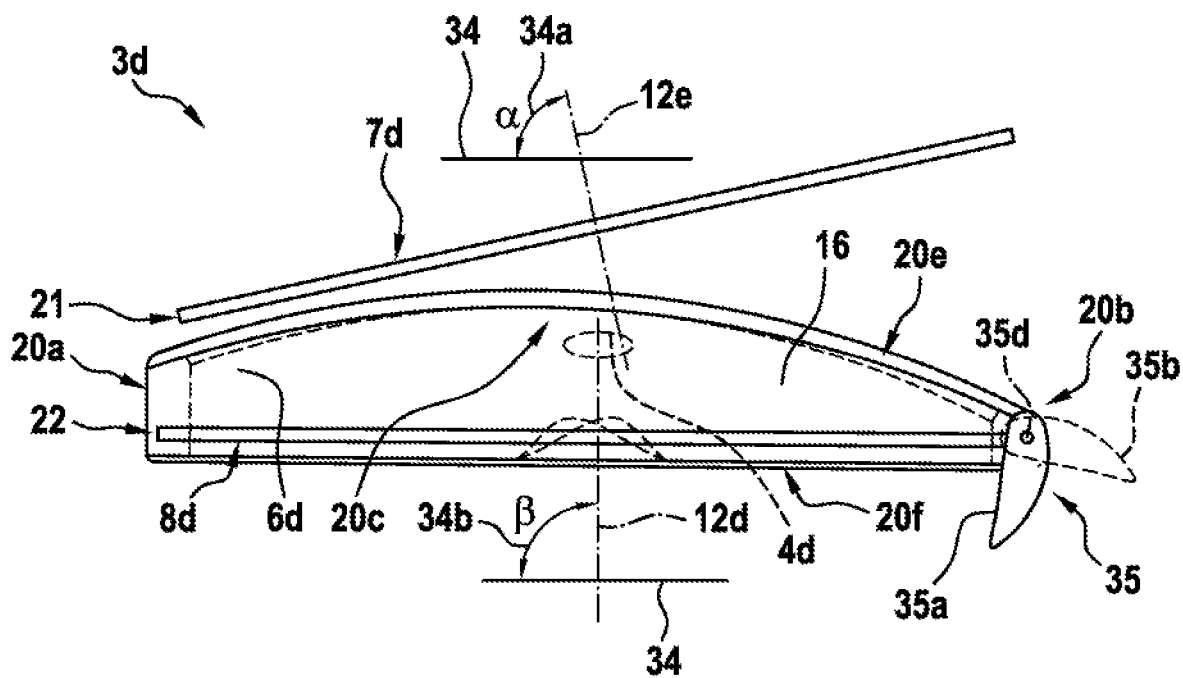
FIG. 15 shows a partly transparent side view of the thrust producing unit of FIG. 5 and FIG. 6 with the shrouding of FIG. 8 to FIG. 10 according to a second variant.

FIG. 15 shows the thrust producing unit 3d of FIG. 5 and FIG. 6 according to Part (C) of FIG. 7, with the shrouding 6d and the upper and lower rotor assemblies 7d, 8d. The shrouding 6d comprises the leading edge 20a and the trailing edge 20b. The upper rotor assembly 7d rotates in operation around the rotor axis 12e and defines the rotor plane 21, and the lower rotor assembly 7d rotates in operation around the rotor axis 12d and defines the rotor plane 22.

The rotor axis 12e is inclined with respect to the rotor axis 12d, as described above. In FIG. 15, this inclination is clarified with respect to a horizontal reference plane 34. More specifically, the rotor axis 12e is inclined with respect to the horizontal reference plane 34 by an associated inclination angle α, which is labelled with the reference sign 34a, and the rotor axis 12d is illustratively perpendicular to the horizontal reference plane 34, as illustrated by means of an associated inclination angle β, which is labelled with the reference sign 34b.

Furthermore, according to one aspect and in contrast to the implementation of the shrouding 6d according to FIG. 5 to FIG. 12, the trailing edge 20b is now equipped with a flap 35 that is preferentially designed as an airfoil. The flap 35 is preferably rotatable around an associated rotation axis 35d and illustrated with continuous lines in an exemplary hover position 35a, as well as with dotted lines in an exemplary forward flight position 35b.

Figure 16:
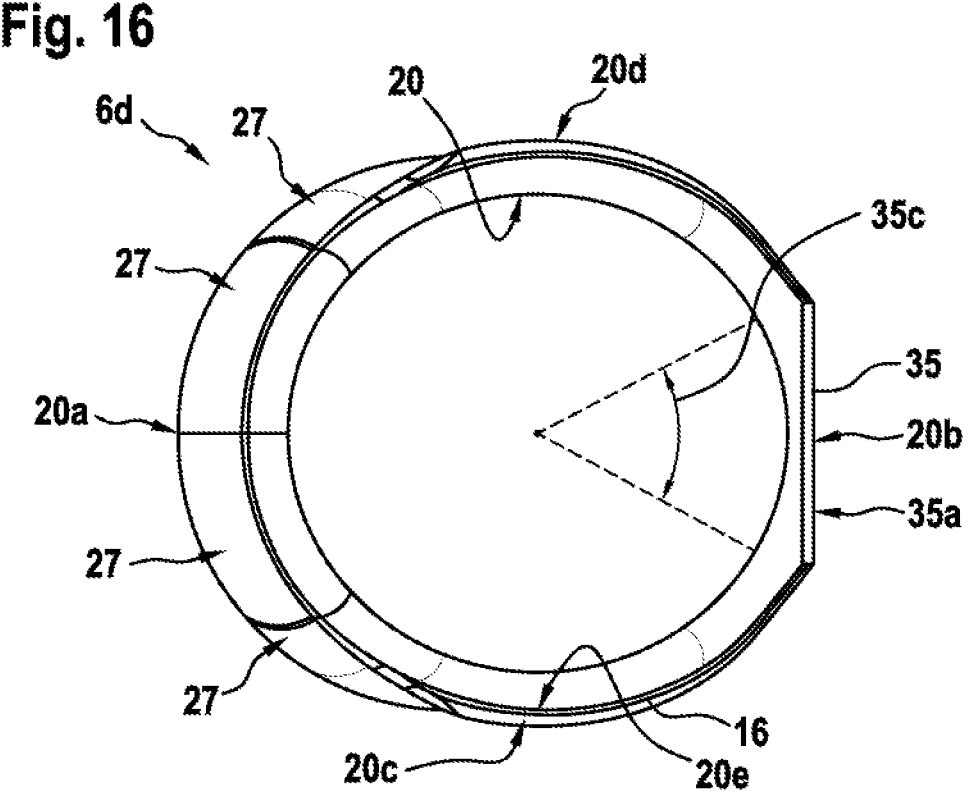
FIG. 16 shows a top view of the shrouding of FIG. 15 during vertical take-off of the multirotor aircraft of FIG. 1 to FIG. 4.

FIG. 16 shows the shrouding 6d of the thrust producing unit 3d of FIG. 15 that is provided with the flap 35 at the trailing edge 20b. Illustratively, the flap 35 is spanned, i.e. extends, over an extension angle 35c at the trailing edge 20b of the shrouding 6d. By way of example, the flap 35 is shown in its exemplary hover position 35a of FIG. 15.

Figure 17:
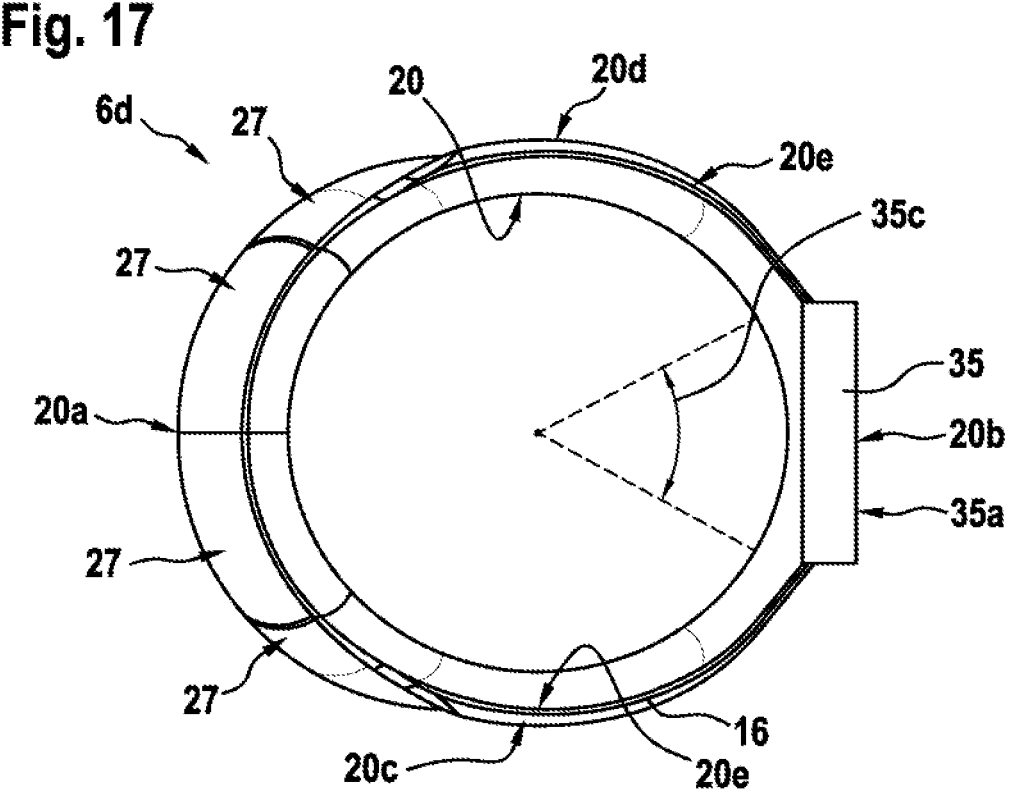
FIG. 17 shows a top view of the shrouding of FIG. 15 during forward flight of the multirotor aircraft of FIG. 1 to FIG. 4.

FIG. 17 shows the shrouding 6d of the thrust producing unit 3d of FIG. 15 that is provided with the flap 35 at the trailing edge 20b, which is spanned, i.e. extends, over an extension angle 35c at the trailing edge 20b of the shrouding 6d according to FIG. 16. By way of example, the flap 35 is now shown in its exemplary forward fight position 35b of FIG. 15.

Finally, it should be noted that modifications of the above described aspects of the present invention are also within the common knowledge of the person skilled in the art and, thus, also considered as being part of the present invention.

REFERENCE LIST

1 Multirotor aircraft
1a Aircraft longitudinal direction
1b Aircraft lateral direction
2 Aircraft airframe
2a Aircraft airframe internal volume
2b Aircraft airframe width
3 Thrust producing units
3a, 3b, 3c, 3d Thrust producing unit
4 Thrust producing units structural supports
4a, 4b, 4c, 4d Thrust producing unit structural support
5 Gearbox fairings
5a, 5b, 5c, 5d Gearbox fairing
6 Shrouding units
6a, 6b, 6c, 6d Shrouding
7 Upper rotor assemblies
7a, 7b, 7c, 7d Upper rotor assembly
8 Lower rotor assemblies
8a, 8b, 8c, 8d Lower rotor assembly
9 Thrust producing airstream direction
10 Ground
10a Vertical resp. perpendicular reference line
11 Longitudinal inclination angles
11a, 11b Longitudinal inclination angle
12 Rotor axes
12a, 12b, 12c, 12d Rotor axis 13 Lateral inclination angles
13a, 13b Lateral inclination angle
14a Upper rotor assembly engine
14b Lower rotor assembly engine
15a Upper rotor assembly rotation direction
15b Lower rotor assembly rotation direction
16 Supporting structure
17 Pitch variation
18a, 18b, 18c Upper rotor assembly rotor blade
19a, 19b, 19c Lower rotor assembly rotor blade
20 Air duct
20a Leading edge
20b Trailing edge
20c Board side lateral shoulder
20d Star board side lateral shoulder
20e Collector
20f Diffusor
20g Air duct inner diameter (D)
20h Air duct azimuth ($\psi$)
21 Upper rotor assembly rotor plane
21a Upper plane inclination angle
22 Lower rotor assembly rotor plane
22a Lower plane inclination angle
23 Thrust vector
23a Hover airstream direction
23b Forward flight airstream direction
24a Total height of air duct leading edge (HL)
24b Total height of air duct trailing edge (HT)
24c Total height of air duct lateral shoulder (HS)
25a Collector radius at air duct leading edge (CRL)
25b Collector radius at air duct trailing edge (CRT)
25c Collector radius at air duct lateral shoulder (CRS)
26a Diffusor radius at air duct leading edge (DRL)
26b Diffusor radius at air duct trailing edge (DRT)
26c Diffusor radius at air duct lateral shoulder (DRS)
27 Additional lifting surface
28 Thrust orientation angle ($\varepsilon$)
28a Reference plane
29 RPM offset control diagram
29a Flight mode axis
29b Rotational speed
30 Upper rotor assembly rotational speed ($\Omega 2$)
31 Lower rotor assembly rotational speed ($\Omega 1$)
32a Hover mode
32b Forward flight mode
33 Stiffening element
33a Stiffening element extension angle
34 Rotor assembly inclination reference plane
34a Upper rotor assembly inclination angle ($\alpha$)
34b Lower rotor assembly inclination angle ($\beta$)
35 Flap
35a Flap hover position
35b Flap forward flight position
35c Flap extension angle
35d Flap rotation axis

What is claimed is:

1. A thrust producing unit for producing thrust in a predetermined direction, the thrust producing unit comprising at least two rotor assemblies and a shrouding that accommodates at most one of the at least two rotor assemblies, wherein the shrouding defines a cylindrical air duct comprising an air inlet region and an air outlet region axially spaced from the air inlet region, with the air inlet region having an undulated geometry in a circumferential direction of the cylindrical air duct;

wherein the cylindrical air duct has a height defined by the axial distance between the air outlet region and the air inlet region in an axial direction of the cylindrical air duct; wherein the height of the cylindrical air duct differs along the circumferential direction of the cylindrical air duct, with the height that differs in the circumferential direction of the cylindrical air duct to define the undulated geometry of the air inlet region; and wherein the cylindrical air duct comprises in the circumferential direction a leading edge, a diametrically opposed trailing edge, a board side lateral shoulder, and a diametrically opposed star board side lateral shoulder, wherein the board side lateral shoulder and the star board side lateral shoulder are respectively arranged in the circumferential direction of the cylindrical air duct between the leading edge and the trailing edge, and wherein the height at the leading edge differs from the height of at least one of the board side lateral shoulder or the star board side lateral shoulder; and wherein at least one rotor assembly of the at least two rotor assemblies that is outside the cylindrical air duct, is arranged above the leading edge, trailing edge, board side lateral shoulder and star board side lateral shoulder, about the undulated geometry of the air inlet region.

2. The thrust producing unit of claim 1,
wherein the height at the board side lateral shoulder and/or the star board side lateral shoulder is selected in a range from 0.05*D to 0.5*D, wherein D defines a diameter of the cylindrical air duct.

3. The thrust producing unit of claim 1,
wherein the air inlet region of the cylindrical air duct exhibits an air inlet region radius extending between the air outlet region and the air inlet region, the air inlet region radius differing between at least two of the leading edge, the trailing edge, the board side lateral shoulder and the star board side lateral shoulder.

4. The thrust producing unit of claim 1,
wherein the air outlet region of the cylindrical air duct exhibits an air outlet region radius extending between the air outlet region and the air inlet region, the air outlet region radius differing between at least two of the leading edge, the trailing edge, the board side lateral shoulder and the star board side lateral shoulder.

5. The thrust producing unit of claim 1,
wherein the trailing edge of the cylindrical air duct is equipped with a flap.

6. The thrust producing unit of claim 1,
wherein the leading edge of the cylindrical air duct is provided with an additional lifting surface.

7. The thrust producing unit of claim 1,
wherein a first rotor assembly of the at least two rotor assemblies comprises a plurality of blades, each of the plurality of the blades being arranged completely outside of the cylindrical air duct and adjacent to the air inlet region of the cylindrical air duct, wherein the shrouding accommodates a second rotor assembly of the at least two rotor assemblies.

8. The thrust producing unit of claim 7,
wherein the first rotor assembly defines a first rotor axis and the second rotor assembly defines a second rotor axis, the first and second rotor axes being coaxially arranged.

9. The thrust producing unit of claim 8,
wherein the first and second rotor axes are inclined by associated inclination angles comprised in a range between −60° and +60°.

10. A multirotor aircraft comprising at least one thrust producing unit that is configured according to claim 1.

11. The thrust producing unit of claim 1,
wherein the trailing edge is open over a predetermined angle of 30° to 60°.

12. The thrust producing unit of claim 11,
wherein the trailing edge of the cylindrical air duct is at least open in the circumferential direction of the cylindrical air duct and provided with a stiffening element, the stiffening element having a predetermined extension angle of 30° to 60°.

13. The thrust producing unit of claim 1,
wherein the height at the trailing edge is smaller than the height of at least one of the board side lateral shoulder or the star board side lateral shoulder.

14. The thrust producing unit of claim 13,
wherein the height at the trailing edge is smaller than the height at the leading edge.

15. An aircraft having a fuselage defining a passenger compartment and a plurality of thrust producing units connected to the fuselage, each of the thrust producing units are connected to the fuselage by a respective structural support and are capable of producing thrust in a predetermined direction and comprise at least two rotor assemblies and a shrouding that accommodates at most one of the at least two rotor assemblies, wherein the shrouding of at least one of the plurality of thrust producing units defines a cylindrical air duct that is axially delimited by an air inlet region and an air outlet region axially spaced from the air inlet region, and wherein the air inlet region of at least one of the plurality of thrust producing units has an undulated geometry of the air inlet region in a circumferential direction of the cylindrical air duct;
  wherein the cylindrical air duct of at least one of the plurality of thrust producing units has a height defined axial distance between the air outlet region and the air inlet region in an axial direction of the cylindrical air duct, wherein the height of the cylindrical air duct differs along the circumferential direction of the cylindrical air duct, wherein the height of the cylindrical air duct that differs in the circumferential direction of the cylindrical air duct defines the undulated geometry of the air inlet region; and
  wherein the cylindrical air duct of at least one of the plurality of the thrust producing units comprises in the circumferential direction a leading edge, a diametrically opposed trailing edge, a board side lateral shoulder, and a diametrically opposed star board side lateral shoulder, wherein the board side lateral shoulder and the star board side lateral shoulder are respectively arranged in the circumferential direction of the cylindrical air duct between the leading edge and the trailing edge, and wherein the height at the leading edge differs from the height of at least one of the board side lateral shoulder or the star board side lateral shoulder;
  and wherein the trailing edge of the cylindrical air duct of at least one of the plurality of thrust producing units has an opening and at least one of the plurality of thrust producing units has a stiffening element adjacent the opening.

16. The aircraft of claim 15,
wherein the height at the trailing edge of at least one of the plurality of thrust producing units is smaller than the height of at least one of the board side lateral shoulder or the star board side lateral shoulder; and
wherein the height at the trailing edge of at least one of the plurality of thrust producing units is smaller than the height at the leading edge.

17. The aircraft of claim 16,
wherein the plurality of thrust producing units comprises four, and at least two of the plurality of the four thrust producing units are symmetrically spaced about the fuselage.

18. The aircraft of claim 15,
wherein, in at least one of the plurality of thrust producing units, the trailing edge of the cylindrical air duct has at least one opening in the circumferential direction of the cylindrical air duct and has at least one stiffening element; the at least one opening being part of the undulated geometry.

19. The aircraft of claim 15,
wherein respective first and second rotor axes of the at least two rotors are inclined relative the axial direction, by associated inclination angles comprised in a range between −60° and +60°.

20. An aircraft comprising:
a fuselage defining a passenger compartment; and
four thrust producing units connected to the fuselage,
wherein each of the thrust producing units is connected to the fuselage by a respective structural support and is capable of producing thrust in a predetermined direction, each of the thrust producing units comprises two rotor assemblies and a shrouding that accommodates at most one of the two rotor assemblies, wherein the shrouding defines a cylindrical air duct axially delimited by an air inlet region and an air outlet region axially spaced from the air inlet region, and wherein the air inlet region has an undulated geometry of the air inlet region in a circumferential direction of the cylindrical air duct;
wherein the cylindrical air duct has a height defined axial distance between the air outlet region and the air inlet region in an axial direction of the cylindrical air duct;
wherein the height of the cylindrical air duct differs along the circumferential direction of the cylindrical air duct, wherein the height of the cylindrical air duct that differs in the circumferential direction of the cylindrical air duct defines the undulated geometry of the air inlet region; and
wherein the cylindrical air duct comprises in the circumferential direction a leading edge, a diametrically opposed trailing edge, a board side lateral shoulder, and a diametrically opposed star board side lateral shoulder, wherein the board side lateral shoulder and the star board side lateral shoulder are respectively arranged in the circumferential direction of the cylindrical air duct between the leading edge and the trailing edge, and wherein the height at the leading edge differs from the height of at least one of the board side lateral shoulder or the star board side lateral shoulder;
wherein the trailing edge of the cylindrical air duct has an opening and at least one of the plurality of thrust producing units has a stiffening element adjacent the opening; and
wherein a first rotor assembly of the at least two rotor assemblies comprises a plurality of blades, each of the plurality of the blades being arranged completely outside of the cylindrical air duct and adjacent to the air inlet region of the cylindrical air duct, wherein the shrouding accommodates a second rotor assembly of the at least two rotor assemblies.

* * * * *